United States Patent [19]
Turpin et al.

[11] Patent Number: 5,764,593
[45] Date of Patent: Jun. 9, 1998

[54] METHOD AND SYSTEM FOR THE INTERCEPTION AND CONTROL OF THE COMPUTER BOOT PROCESS

[75] Inventors: Kevin J. Turpin, Orem; Lawrence K. Stephens, Salem; Christopher P. Clark, Salt Lake City, all of Utah

[73] Assignee: KeyLabs, Inc., Provo, Utah

[21] Appl. No.: 760,323

[22] Filed: Dec. 4, 1996

[51] Int. Cl.⁶ ........................................... G06F 9/06
[52] U.S. Cl. ........................ 395/652; 395/200.52
[58] Field of Search ................... 395/651, 652, 395/653, 712, 200.5, 200.51, 200.52

[56] References Cited

U.S. PATENT DOCUMENTS

| | | | |
|---|---|---|---|
| 4,663,707 | 5/1987 | Dawson | 364/200 |
| 5,134,580 | 7/1992 | Bertram et al. | 396/650 |
| 5,136,711 | 8/1992 | Hugard et al. | 395/700 |
| 5,146,568 | 9/1992 | Flaherty et al. | 395/500 |
| 5,261,104 | 11/1993 | Bertram et al. | 395/700 |
| 5,280,627 | 1/1994 | Flaherty et al. | 395/652 |
| 5,325,529 | 6/1994 | Brown et al. | 395/700 |
| 5,325,532 | 6/1994 | Crosswy et al. | 395/700 |
| 5,379,431 | 1/1995 | Lemon et al. | 395/700 |
| 5,404,527 | 4/1995 | Irwin et al. | 395/700 |
| 5,418,918 | 5/1995 | Vander Kamp et al. | 395/375 |
| 5,444,850 | 8/1995 | Chang | 395/200.52 |
| 5,452,454 | 9/1995 | Basu | 395/652 |
| 5,469,573 | 11/1995 | McGill, III et al. | 395/700 |
| 5,546,585 | 8/1996 | Soga | 395/700 |
| 5,564,054 | 10/1996 | Bramnick et al. | 395/700 |

OTHER PUBLICATIONS

IBM Remote Program Load User's Guide, 83X7840.
IBM Token–Ring Network Architecture Reference, SC30–3374–02, 39F9354.
Open Data–Link Interface Developer's Guide for NetWare DOS Workstation Drivers, Part No. 107–000010–001.
Open Data–Link Interface Developer's Guide for DOS Workstation Protocol Stacks.

*Primary Examiner*—Kevin A. Kriess
*Attorney, Agent, or Firm*—Lloyd W. Sadler

[57] ABSTRACT

A method, implemented as a computer program in a digital computer system, for interrupting, modifying and/or controlling the boot process of a computer, automatically (without manual intervention) across a computer network. When a network manager needs to install software, test, maintain or gather information concerning one or more of the computer systems on the network, this invention permits the network manager to take control of the networked computer during its boot process, and in so doing to reconfigure both the networked computer's hardware and software, and to do so remotely. When fully implemented an entire network may be automatically controlled and tested remotely, all networked computers simultaneously or in sequence. An important improvement over methods of modifying the boot process which require manual intervention on individual computers or which require the use of expensive special purpose hardware devices which must be installed within each networked computer. In the best mode of operation, the method of this invention is performed on standard digital computer hardware through the use of special computer programs.

12 Claims, 3 Drawing Sheets

METHOD AND SYSTEM FOR THE INTERCEPTION AND CONTROL OF THE COMPUTER BOOT PROCESS

BACKGROUND OF THE INVENTION

1. Field of the Invention

This invention relates to the mechanism by which the normal boot process of a computer system can be intercepted and controlled. More specifically, this invention provides a method and system for interrupting the normal boot process of a computer system to execute specialized commands before the normal boot process is executed. Furthermore, this invention provides the capability for modifying the software configuration of the computer system, selecting the computer processor in control of the computer system and selecting the boot image program.

2. Description of Related Art

It is common in the configuration of personal computers to connect an number of individual personal computers together as a network. Often a network is referred to as a Local Area Network (LAN) or a Wide Area Network (WAN). Often it is desirable to control the individual networked computer remotely, through the network. However, control is limited if the individual computer is permitted to boot (start-up) through its "normal" procedure. The ability to control the boot process to adapt the individual computer's configuration; to execute a command file; to select the boot program; and to select the controlling operating system, all remotely from a central controlling processor, can provide a vastly improved mechanism for network control, maintenance, service, security, data back-up, software installation, and test.

Prior known methods for gaining control of a computer prior to the "normal" boot process usually require specialized digital hardware to be installed within each networked computer. The most common example of this type of added hardware is called a "BootROM." A "BootROM" is a non-volatile hardware memory circuit which is installed into a special purpose socket on a network interface card (NIC). Program code in the "BootROM" gains control of the computer during the pre-boot processing. the "BootROM" code examines a file on a network server for boot commands, and then boots from either the local hard disk or from image files stored on the network server computer. The overall effect of the hardware "BootROM" is that the computer's boot sequence is intercepted and redirected to execute commands stored on a network server.

However, the "BootROM" approach has several problems, that prior approaches have not solved. First, "BootROMs" require specialized computer hardware to be installed in each individual computer. This hardware and its installation is expensive and time consuming, especially when hundreds or thousands of computers require the installation. In contrast, this new invention requires only a software installation, which by its very nature is much less time consuming and much less expensive.

A second problem with the "BootROM" approach is that the "BootROM" circuit must be designed for each specific network interface card. A different "BootROM" must be used for every different NIC in use. In some cases, "BootROMs" are not available at all for certain types of NICs. In contrast, this new invention can be easily configured to support any NIC for which a software driver program exists. This greatly increases the number of supported NICs.

Another problem with "BootROMs" is that they require specialized programs on the network server computer to respond to their requests. A typical protocol called "Remote Program Load" (RPL) is frequently used by "BootROMs," and RPL modules must be loaded on the server in order for the system to operate. In contrast, this new invention requires no special protocols to operate. In fact, this invention is independent of protocol and server type. With suitable programming this invention can work with virtually any type of server or networking protocol.

For general background art the reader is directed to U.S. Pat. Nos. 4,663,707, 5,134,580, 5,136,711, 5,261,104, 5,325,529, 5,379,431, 5,325,532, 5,404,527, 5,418,918, 5,444,850, 5,452,454, 5,469,573, 5,546,585, 5,564,054 each of which is hereby incorporated by reference in its entirety for the material disclosed therein.

U.S. Pat. No. 4,663,707 discloses a computer system which includes multiple levels of bootstrap code.

U.S. Pat. No. 5,134,580 discloses a computer system and an initialization system for loading alternative operating systems.

U.S. Pat. No. 5,136,711 discloses a system for integrating multiple incompatible absolute zero sector operating systems on the same hard disk drive.

U.S. Pat. No. 5,261,104 discloses a computer system with an internal operating system that can be initialized in either that operating system or in an alternative operating system of choice such as one located on an external memory device.

U.S. Pat. No. 5,325,529 discloses a computer system which can receive boot information over a parallel or serial port.

U.S. Pat. No. 5,325,532 discloses a computer system which includes device driver software in ROM. Based on the presence of removable medium final device drivers are stored on a selected hard disk, a boot image is generated and may be loaded thereby commencing operating system execution.

U.S. Pat. No. 5,379,431 discloses a system for use in booting a processor with storage and attached peripherals.

U.S. Pat. No. 5,404,527 discloses an apparatus and method for retrieving and sending the bootstrap loader and the DOS code from disk storage on a file server in a network to a workstation in the network during the boot process of the workstation.

U.S. Pat. No. 5,418,918 discloses a computer system capable of booting currently manufacturable CD-ROMs or tapes without altering the ISO standard or requiring special, customized software.

U.S. Pat. No. 5,444,850 discloses a method and apparatus for preboot file and information transfer between workstations and other workstations or workstations and servers on local area networks.

U.S. Pat. No. 5,452,454 discloses a system and method for booting a client workstation from a remote data processing system over a network.

U.S. Pat. No. 5,469,573 discloses a data backup procedure and apparatus for backing up and restoring, or otherwise loading a fully configured operating system to the high capacity storage device of a computer workstation, such as a personal computer.

U.S. Pat. No. 5,546,585 discloses a virtual floppy disk region having the same contents as that of a floppy disk for starting provided to a magneto-optic recording playback device as an external mass storage device of a personal computer, making possible the system start-up from the operating system stored therein.

U.S. Pat. No. 5,564,054 discloses a boot apparatus and method using login files that are necessary to successfully boot a computer and corresponding to a preselected, minimal system configuration, are stored in a predetermined location in a selected mass storage device attached to the computer.

None of these prior related art references discloses a method or system capable of being used with standard networking drivers, without depending on specialized BootROM firmware and without requiring the addition of specialized computer hardware.

OBJECT OF THE INVENTION

It is desirable to provide a method or process for remotely controlling the processing and configuration of networked computers from a central common location, specifically that of the network system administrator.

It is an object of this invention to provide a method for commanding a computer to run programs which control the configuration of the computer.

It is a further object of this invention to provide a method gaining control of a networked computer prior to the "normal" boot procedure.

It is a further object of this invention to provide a process for executing customized commands in a computer before the computer's "normal" boot procedure has executed and furthermore to control the execution of these customized commands across a computer network.

It is a further object of this invention to provide a process for controlling a computer across a network device without requiring the use of specialized computer hardware.

It is a further object of this invention to provide an method for interrupting the boot process of a networked computer and initiating commands, where said method is independent of network interface card hardware, protocol and server types.

Additional objects, features and advantages of this invention will become apparent to persons of ordinary skill in the art upon reading the remainder of the specification and upon referring to the attached Figures.

SUMMARY OF THE INVENTION

These objects are achieved by a computer program, consisting of two major computer routines. The first is the Master-Boot-Record (MBR) Loader and the second is the Bootwork routine. In the preferred embodiment of the invention a third routine, the Installation Utility is also used to create a special "automation" partition on the system hard disk.

The Installation Utility creates an automation partition on the hard disk populated with a common operating system (such as PC DOS), Local Area Network (LAN) drivers for the Network Interface Card (NIC), and a program for reading a database on the network server to ascertain the automation commands to be executed. There are two requirements for installation of the automation partition. First, there must be at least one free slot in the boot disk partition table. Second, there must be sufficient free disk space on the boot disk to allow for the installation of the automation partition.

The Installation Utility also installs the customized Master-Boot-Record (MBR) code, replacing the "normal" Master-Boot-Record code found on the computer. This customized MBR code is used, during system boot, to force a transfer of control to the programming in the automation partition. At this point a determination is made regarding the automation commands to be executed by the computer.

The MBR is the first sector of the first hard disk of the computer system. When a computer is powered on or is reset, the computer system firmware (e.g. ROM BIOS) performs functionality tests on the computer hardware and then loads and transfers control to program code contained within the MBR.

The customized MBR code examines the partition table flags (a small database contained within the MBR which specifies the location and type of partitions on the disk) to determine which of the four partitions to load and execute. The MBR code finds the specialized automation partition on the disk and transfers control to the code in the automation partition.

The automation partition code loads an operating system (OS) which is located in the automation partition. After the OS is loaded, local area network (LAN) drivers for the resident network interface card (NIC) is loaded. The LAN drivers establish a link or connection with the network server computer. At this point the specialized Bootwork routine runs.

The Bootwork routine examines a database on the network server to determine whether or not the network administrator has specified that automation commands should be executed. If it is determined that automation commands should be executed, the computer is directed to execute pre-configured batch commands which perform configuration or software customization of the computer. The specific commands executed are specified by entries in the network server database. When these automation commands are finished, the computer can either reboot itself or it can wait for further commands from the network.

If it is determined that no automation commands are specified, the computer will need to boot from its "regular" operating system. To enable a "regular" boot, programming sets a special flag in nonvolatile storage, usually on the hard disk, which directs the MBR code to boot the "normal" operating system instead of the automation partition. The computer is then rebooted, and when the MBR code again gains control, it recognizes the special flag and causes the "normal" operating system to boot. Before booting the "normal" operating system, the MBR code resets the special flag, so that the next time the computer boots, it will be directed to again boot from the automation partition. In this manner, the automation partition always gains control before the "normal" operating system, thus providing a method of controlling the computer system before it boots "normally."

For the purposes of this application the applicant defines the terms "normal", "normally", "regular", and "regularly" to mean the sequence of booting events that the computer would go through in the absense of this invention.

In the preferred embodiment, the method of this invention is accomplished in software which runs on a personal computer platform. This preferred embodiment of the computer platform includes an input device, a nonvolatile storage device, a display device, a processor and memory storage (both dynamic and static memory). This invention can operate under a variety of computer operating systems including but not limited to Windows™, Windows-95™, Macintosh™, Unix, and DOS. The current preferred embodiment of the invention operates on DOS, Windows™, Windows-95™ operating systems.

DETAILED DESCRIPTION OF THE INVENTION

Figure 3:
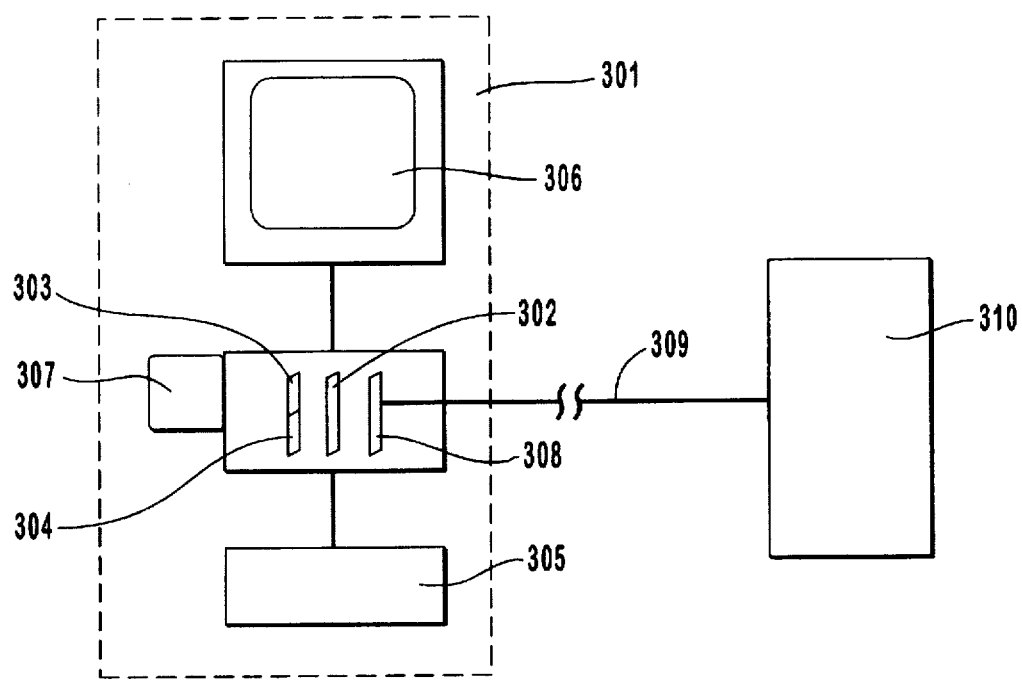
FIG. 3 shows a representative diagram of the computer hardware components typically involved in practicing this invention.

This invention is designed to operate within and on a computer system 301 as shown in FIG. 3. Typically the computer system comprises the following common hardware components: a central processing unit (CPU) 302, both random access memory (RAM) 303 and read only memory (ROM) 304, an input device 305 (typically a keyboard and/or a "mouse" tracking device), a display device 306 (typically a CRT or a LCD panel), a long term storage device 307 (typically a hard disk drive, a floppy disk drive, a compact disk (CD) drive or a tape drive), and, in the preferred embodiment of this invention, a network interface card (NIC) 308. Furthermore, the preferred embodiment of this invention makes use of a computer network 309 as it is commonly known by people of ordinary skill in the art. This network 309 is managed by a server 310. A server 310 is typically a relatively high performance computer system configured with special purpose software and network interface hardware to monitor and manage the flow of data across the network. Other possible applications of this invention may not require all of these hardware components. For example, although not the currently envisioned best mode of the invention, this invention could be applied to a computer system without a network connection or a server. Such a use of the invention could provide the means of booting the computer from another processor or another drive within the computer. It could also provide the means for booting the computer with a different operating system without the requirement of human intervention. After reviewing this disclosure, a variety of applications of the essence of the invention will be apparent to people of ordinary skill in the art. It is the applicant's intention that all such applications of this invention be considered within the protectable scope of this invention.

Figure 1:
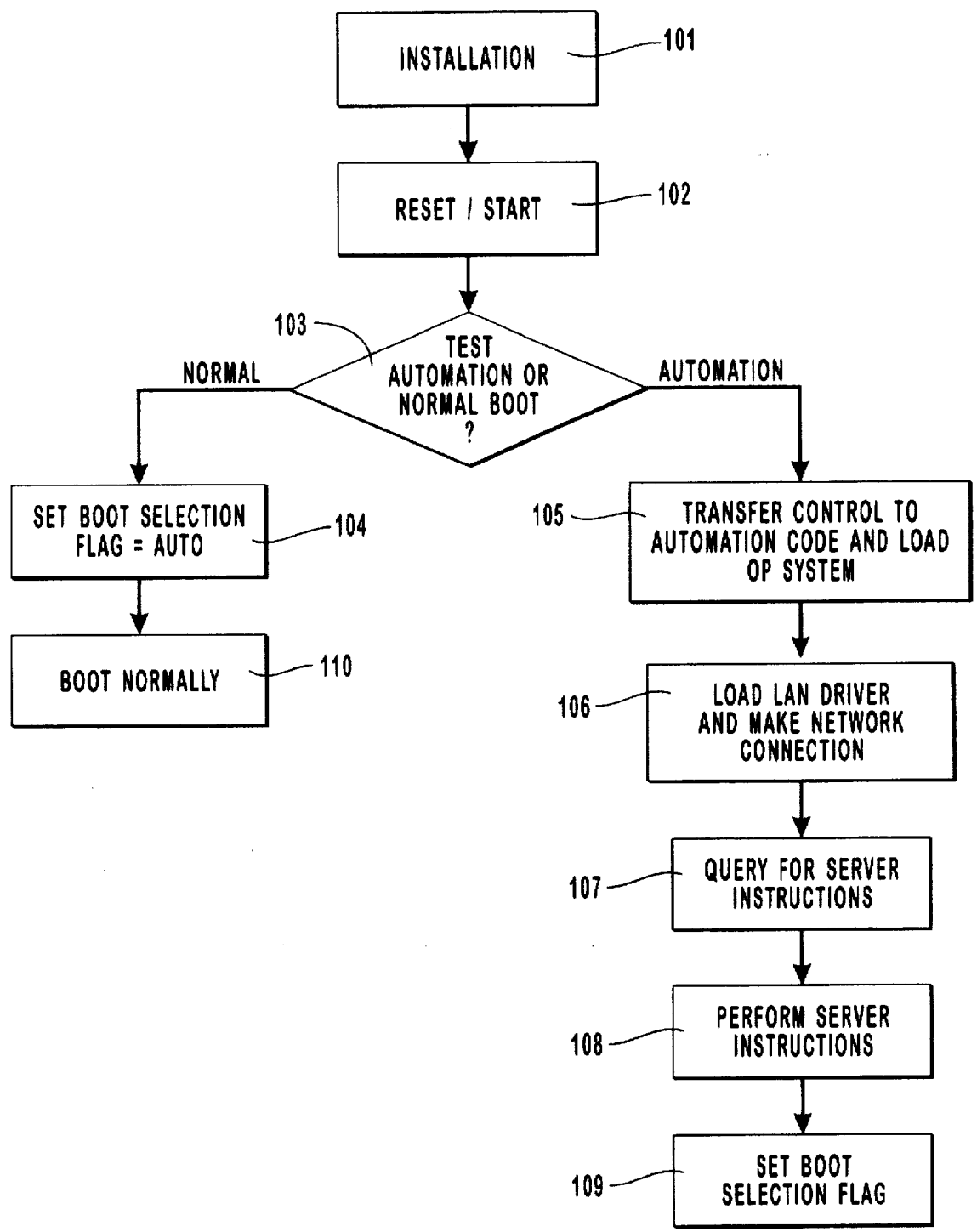
FIG. 1 is a flow diagram showing the top level steps of one preferred embodiment of the method of the invention.

FIG. 1 depicts the top level steps of the preferred embodiment of the invention. The preferred embodiment of the invention begins with the installation 101 of the special automation partition on the computer hard disk. This installation 101 populates the automation partition with a common operating system (such as DOS), local area network (LAN) software drivers for the network interface card (NIC) present in the computer, and a computer program to read from a network server 310 a database of automation commands. For installation to be successful in the best mode of operation two requirements must be met. First, there must be at least one free slot in the boot disk partition table. Second, there must be sufficient free space on the boot disk to allow for the installation of the automation partition.

The installation 101 also installs custom program code in the Master Boot Record (MBR) of the hard disk. This custom MBR code replaces the "normal" MBR code found on the computer hard disk. The original, "normal", MFR code is saved to a second location of the hard disk for use in "normal" boot operation. The custom MBR code is used to force a transfer of control to the program in the automation partition during the computer system boot, at which point a determination is made regarding the automation commands to be executed.

The reset/start 102 step of the invention includes computer hardware initialization and a load to system RAM of code contained in the MBR.

The custom MBR code examines the flags in the partition table to determine which partition is to be loaded and executed. This step of the process of the invention is a test of whether an automation boot or normal boot should be implemented 103. If this test 103 indicates that the automation boot should be performed, then the MBR code finds the automation partition on the hard disk 307, transfers control of the boot process to the code in the automation partition, which then loads the computer operating system 105. When the operating system has been loaded the LAN drivers for the resident NIC 308 are loaded 106, also from the automation partition, and a connection is established across the network 309 to the network server 310. The network server 310 is queried 107 for instructions. These network server instructions are then performed 108. The invention also includes the step of setting the boot selection flag 109 to be tested 103 on the next boot cycle for an automation boot or a normal boot.

If the test 103 indicates that a normal boot is called for, the boot selection flag is set to automation 104 and the computer boots normally 110. The boot selection flat is set to automation 104 so that on the next boot cycle the test for automation or normal boot 103 can be performed.

Figure 2:
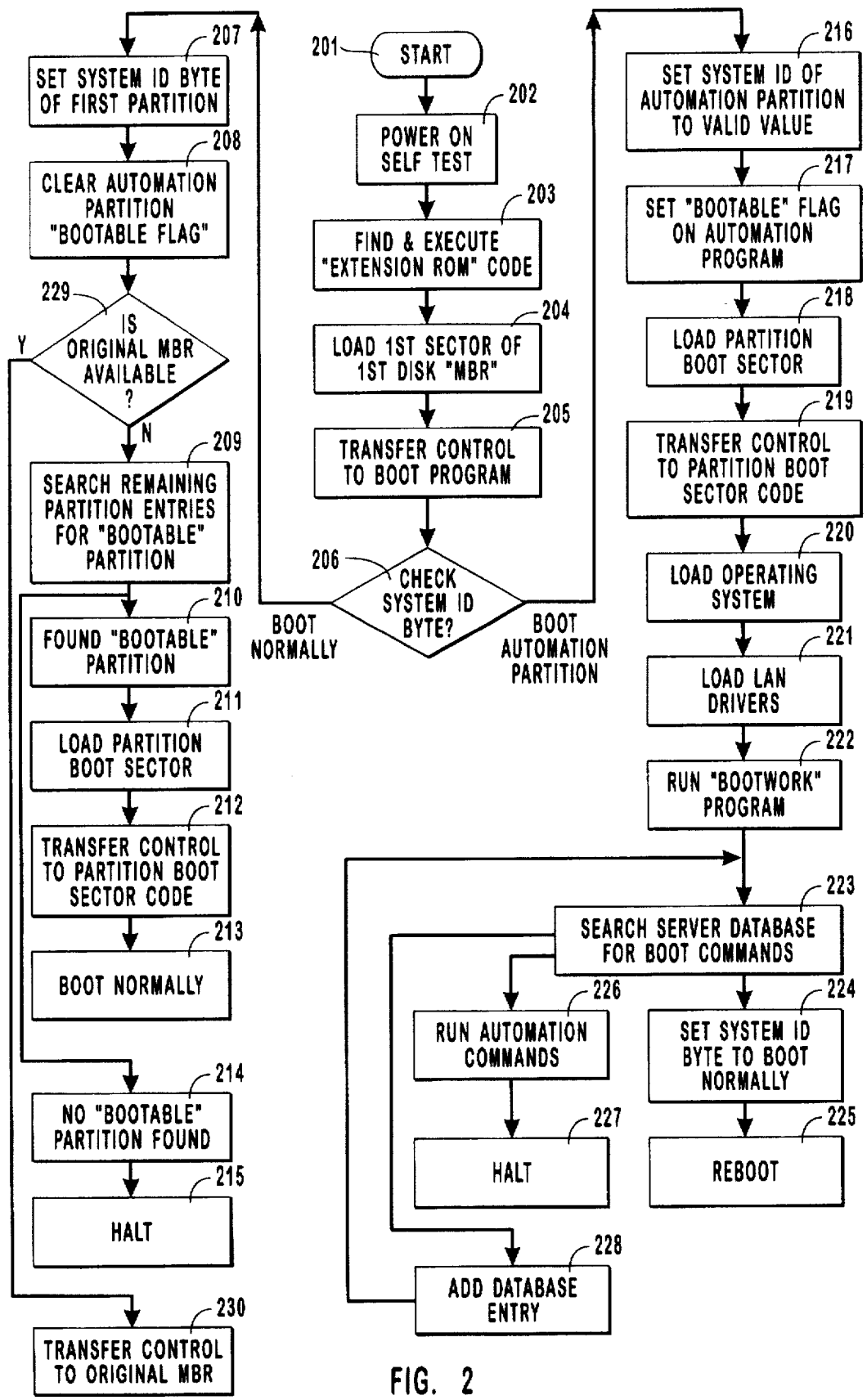
FIG. 2 is a detailed flow diagram of the current preferred embodiment of the method of the invention.

FIG. 2 depicts a detailed flow diagram of the preferred embodiment of the invention, beginning after initialization of the automation partition code 101. Start 201 is initiated by a power-up reset or a software reset operation. Following the start 201 step a power-on computer hardware self-test 202 is performed. The purpose of this self-test 202 is to verify the functionality of the computer hardware. Extension ROM code is found and executed 203. Typically, the extension ROM code is found within peripheral device cards. At this point the first sector of the first hard disk is loaded 204. This sector is referred to as the Master Boot Record (MBR). Control of the computer is transferred 205 to the MBR code. The system ID byte is tested 206 to determine whether it is intended that the computer system boot normally or that the computer system boot from the automation partition.

If it is intended that the computer should boot normally, the system ID byte, tested in step 206, is set 207 to ensure that the next boot process should go through the automation partition. The automation partition table bootable flag is cleared 208. The remaining partition entries on the first hard disk 307 are searched 209 for "bootable partitions." If no "bootable partition" is found 214 then an error has occurred and a message may be displayed., after which the computer system is halted 215. If a "bootable partition" is found 210 then the partition boot sector is loaded 211. Control of the boot process is transferred 212 to the partition boot sector code, and the computer system boots normally 213. Alternatively, if the original MBR is found 229, control is transferred to the original MBR 230 to initiate a "normal" boot.

If the system ID byte indicates that the computer system should be booted from the automation partition (see step 206), then the system ID of the automation partition is set 216 to a valid value. The automation partition bootable flag is set 217. The partition boot sector is loaded 218 into memory. Control of the computer boot sequence is transferred 219 to the partition boot sector code. The operating system is loaded 220. The LAN drivers are loaded 221.

The "Bootwork" program is run 222. The purpose of the "Bootwork" program is to process commands, during the boot procedure, from a source external to the normal boot procedure. Typically these commands will be resident on an external disk drive unit attached to a network server 310.

The server 310 contains a database of valid boot commands. This database is searched 223. If "Boot Production" commands are found, then the computer system ID is set 224 to boot normally and the computer system is software rebooted 225, returning the process of the invention to step 201.

If "Automation" commands are found in the database search of step 223, the automation commands are executed, or run, 226. These automation commands can perform a wide variety of functions, including but not limited to: booting a different operating system, reconfiguring the computer hardware, testing hardware or software, loading software, backing up software, running network diagnostics and/or performing special purpose functions. The automation commands are typically organized as a batch file and are intended to run without human intervention, although if it was desirable, human intervention can be designed into the automation commands. The automation commands themselves may include commands for waiting for additional commands, for rebooting in new configuration, or for halting 227 when the process is completed. Eventually the process halts 227, at which point the computer system can be rebooted.

If the search 223 of the server database finds no valid pre-existing database entries, a database entry is added 228 to the database, and the server database is again searched 223 for boot commands.

In the preferred embodiment of the invention the process or method of the invention is performed on personal computers connected through a computer network to a server computer, and is performed by one or more software programs, which reside on the networked personal computer and/or the server computer. It is possible to implement the intention on various other computer hardware configurations. In the current best mode of this invention, the software programs are coded in the C++ programming language and in Intel X-86 assembly language. A Software Appendix, included as a part of the disclosure of this patent application, shows in detail how the functional steps of the invention are performed. Of course, it is contemplated that the inventive concept of this invention may be implemented through other techniques and in other embodiments and in other computer languages. The computer source code provided in the Software Appendix describes the current best mode of operation of the invention, such best mode may evolve and change over time, after the filing of this application, without altering the fundamental inventive concept of the method, which is the automatic interruption and modification of the boot process of a computer system without requiring additional special purpose computer hardware.

Software Appendix

```
        PAGE 60,132
;/****************************************************************/
; *
; *   (C) Copyright 1996 KeyLabs, Inc.
; *   All Rights Reserved.
; *
; *   This program is an unpublished copyrighted work which is
; *   proprietary to KeyLabs, Inc. and contains confidential
; *   information that is not to be reproduced or disclosed to
; *   any other person or entity without prior written consent
; *   from KeyLabs, Inc. in each and every instance.
; *
; *   WARNING: Unauthorized reproduction of this program as well as
; *   unauthorized preparation of derivative works based upon the
; *   program or distribution of copies by sale, rental, lease or
; *   lending are violations of federal copyright laws and state trade
; *   secret laws, punishable by civil and criminal penalties.
; *
;
;****************************************************************/
;
CODEORG    equ   0600h ; offset of this code in code seg ;; These next two values MUST match the values in the install program.
SYSID_BOOTPROD equ  0feh ; SysID that flags us to boot "production"
                         ; instead of booting the automation
                         ; partition.
SYSID_INVALID  equ  0f0h ; SysID that we stamp on the automation
                         ; partition in order to "hide" the automation
                         ; partition when booting "production".
SYSID_FAT12    equ  01h  ; SysID for 12-bit DOS FAT.

PARTITION_ACTV equ  080h ; Flag for active partition.

; Declares some offsets in segment zero
segZero    segment   at 0 org   CODEORG + (offset begin - offset main)
begin1     equ   $ org   7c00h
part_start dw    ?

segZero    ends

;;
****************************************************************
```

```
codeseg    segment
           assume cs:codeseg, ds:codeseg

; Initial program entry point
; Assembles as if at offset 0--actually runs at 7c00 main:
           jmp      near main2 db       "KeyLabs BootMaster",0 main2:
           ; Set up the stack
           xor  ax,ax
           mov  si,7C00h    ; just before load location
           cli
           mov  ss,ax
           mov  sp,si
           sti ; Relocate this code from 0:7C00h to 0:CODEORG
           mov  ds,ax
           mov  es,ax
           mov  si,7C00h    ; where this program is initially loaded
           mov  di,CODEORG
           mov  cx,0100h
           cld
           rep  movsw ; Jump to relocated code (0:CODEORG)
           jmp  far ptr begin1
begin      equ  $

;;
;;****************************************************************

;; If sysid on first partition is SYSID_BOOTPROD, then set sysid byte
;; to SYSID_INVALID and boot first active partition on the disk.
;; If sysid on first partition is anything else, then set sysid
;; byte to SYSID_FAT12 and boot that first partition.

mov  bx, 7c00h + 01beh;  Point to first partition.
           cmp  byte ptr [bx+4], SYSID_BOOTPROD
           jz   short boot_active ;; First partition system-id byte not set to "boot production"
;; so we boot the automation partition.

boot_automation:
```

```
;; Print message that we're booting the special partition.
push bx
mov  si, offset msgbootAutom + CODEORG
call puts
call putnl
pop  bx ;; We need to make sure the first partition is marked
;; ACTIVE, and has a system id of 1 (DOS 12-bit FAT)
;; If BOTH of these are already set, we don't need to
;; change anything.
cmp  byte ptr [bx+4], SYSID_FAT12; check system id
jne  short set_first
cmp  byte ptr[bx], PARTITION_ACTV; check partition-active
                                 ; flag
jne  short set_first
;; Else both values are already set, so we don't
;; need to do anything.
jmp  short set_first_done set_first:
        ;; Setup ACTIVE flag and system id byte mov byte ptr [bx], PARTITION_ACTV; Active
        mov byte ptr[bx+4], SYSID_FAT12; DOS 12-bit FAT.

;; Now write the sector to disk.
        call write_first_sector

;; Update copies in low memory too.
        mov bx, 0600h + 01beh
        mov byte ptr [bx], PARTITION_ACTV
        mov byte ptr [bx+4], SYSID_FAT12 set_first_done:

mov si, 0600h + 01beh; Setup pointer to first partition jmp load_and_boot

;; ***********************************************
;; Load the "original" MBR code which has been stored away
;; in the second sector of the disk and jump to it
;; (after fixing up the partition table, of course).

boot_active:

;; Fixup the parition table first...
        ;; Set sysid of first partition to SYSID_INVALID (invalid
        ;; partition type)
```

```
            ;; And clear the ACTIVE flag.
            cmp  byte ptr [bx+4], SYSID_INVALID
            jnz  short reset_first
            cmp  byte ptr [bx], 0
            jnz  short reset_first
            ;; Else both values are already set, so we don't need to
            ;; do anything.
            jmp  short reset_first_done reset_first:
            ;; set system byte to SYSID_INVALID.
            mov  byte ptr [bx], 0h; NOT active
            mov  byte ptr [bx+4], SYSID_INVALID; Invalid partition type.

;; Update copies in low memory too.
            mov  bx, 0600h + 01beh
            mov  byte ptr [bx], 0h; NOT active
            mov  byte ptr [bx+4], SYSID_INVALID; Invalid partition type.

;; Now write the sector to disk.
            call write_first_sector reset_first_done:
            ;; Load the original MBR code into 0:7c00 and jump to it.
            ;; If the original MBR code isn't there, try to boot the
            ;; "active" partition ourselves.

mov  cx,5       ; Retry count
rloop:
            push cx
            mov  ax,0201h   ; Read, one sector.
            mov  cx,0002h   ; Read from cyl 0, sector 2.
            mov  dx,0080h   ; Read from first hard drive 80h)
            mov  bx,7e00h   ; Read into es:bx  (0:7e00) (temp buffer)
            int  13h        ; Read the sector.
            pop  cx
            jnc  rd_ok
            loop rloop rd_bad:
            mov  si, offset msgread + CODEORG
            jmp  short _error rd_ok:
            ;; We've read the second sector of the disk into 0:7e00.
            ;; Check for the signature.
            mov  cx,sig_length
            mov  si, offset signature + CODEORG
            mov  di, 7e00h ; Temp buffer location
            repe cmpsb
```

```
                jne     no_signature_found
signature_found:
                ;; We've found the saved MBR code, so construct a synthetic
                ;; MBR sector at 0:7c00 comprising the saved MBR code and
                ;; "current" partition table. (i.e. move saved MBR code down
                ;; to 0:7c00, but do NOT overlay the new partition table at
                ;; 0:7c00 + 1beh
                mov     cx,01beh        ; Move this many bytes
                mov     si,7e00h + sig_length; From here
                mov     di,7c00         ; To here
                rep     movsb mov     si, offset msgBootOrg + CODEORG
                call    puts
                call    putnl ;; Now jump to the restored MBR code at 0:7c00.
                jmp     far 0:7c00h ;; ***************************************************
;; Didn't find a saved MBR, so try to load active partition ourselves.

no_signature_found:

find_it:
                mov     cx, 3           ; search this many entries
                mov     si, 0600h + 01beh + 010h ; start looking at second
                                        ; entry.
srch_loop:
                cmp     byte ptr [si], PARTITION_ACTV
                jz      short found_active add     si, 0010h ;  point to next table entry.
                loop    srch_loop none_active:
                mov     si, offset msgnoactv + CODEORG
_error:
                call    puts
                call    putnl
halt_cpu:
                jmp     short halt_cpu found_active:
                ;; si points to active table entry in low memory.
                ;; Invalidate all others in the in-memory copy.
                push    si mov     di,si           ; Save address of "active" entry
```

```
                        ; so we don't invalidate that one.
            mov   cx,4        ; Count of entries to check.
            mov   si,0600h + 01beh invalidate:
            cmp   di,si
            jz    short cont   ; Don't invalidate the active one.
            mov   byte ptr [si+4], SYSID_INVALID; Invalidate the sysid
                                                ; byte.
cont:
            add   si,0100h   ; Point to next partition entry.
            loop  invalidate pop   si jmp   load_and_boot

;;
;*********************************************************************** load_and_boot:

mov   cx,5       ; retry count
retry:
            push  cx
            mov   dx,[si]     ; drive, head
            mov   cx,[si+2]  ; cyl, sector
            mov   bx,7C00h   ; destination (es=0)
            mov   ax,0201h   ; BIOS read one sector
            int   13h
            jnc   read_ok
            xor   ax,ax       ; reset disk
            int   13h
            pop   cx
            loop  retry
            mov   si, offset msgread + CODEORG
            jmp   short _error
read_ok:
            pop   cx ;; Check for valid magic number in secondary boot sector mov   bx,7c00h + 1feh; address of signature word.
            cmp   word ptr [bx], 0aa55h
            jz    short magic_ok mov   si, offset msginvalid + CODEORG
            jmp   short _error magic_ok:
```

```
; Make sure ds:si points to the booted partition, and
; Jump to the secondary boot program.

jmp     0:7c00h

;**************************************************************
; Subroutines
;**************************************************************
CR              EQU     13
LF              EQU     10 putc            proc near       ; print char in AL
                mov     ah, 0Eh ; uses: ax, bx
                mov     bx, 07
                int     10h
                ret
putc            endp putnl           proc near       ; print a newline
                mov     al, CR  ; uses: ax, bx
                call    putc
                mov     al, LF
                call    putc
                ret
putnl           endp puts            proc near       ; print string at address SI
                mov     cx,80   ; Stop at null or CX chars
putn:           lodsb           ; uses: ax, bx, cx, si
                cmp     al,0
                jz      puts_e
                push    cx
                call    putc
                pop     cx
                loop    putn
puts_e:         ret
puts            endp write_first_sector      proc near
                mov     dx,0080h  ; head 0 (dh=0), drive 0 (dl=0x80)
                mov     cx,0001h  ; cyl 0 (cx[15..6]=0), sect 1 (cx[5..0]=1)
                mov     ax,0301h  ; write sector (ah=3), 1 sector (al=1)
                mov     bx,7C00h  ; buffer pointer
                int     13H
                jnc     short write_done ;; Else print error message and continue.
                mov     si, offset msgwrerr + CODEORG
                call    puts
                call    putnl
```

```
write_done:
        ret
write_first_sector    endp

;*************************************************************
; Strings
;************************************************************* msgread         db      "Rd",0
msginvalid      db      "Inv",0
msgwrerr   db   "Wr",0
msgnoactv  db   "NoActv",0
msgbootAutom    db      "BootAuto",0
msgBootOrg      db      "BootOrg",0

;; This is the signature string we expect to find at the
        ;; beginning of the saved MBR sector.
signature db    "SavedMBR",0
sig_length      equ     $ - signature org     1BEh ; pad the length codeseg ends end     main
```

```
/****************************************************************
 *
 *   (C) Copyright 1996 KeyLabs, Inc.
 *   All Rights Reserved.
 *
 *   This program is an unpublished copyrighted work which is
 *   proprietary to KeyLabs, Inc. and contains confidential
 *   information that is not to be reproduced or disclosed to any
 *   other person or entity without prior written consent from
 *   KeyLabs, Inc. in each and every instance.
 *
 *   WARNING: Unauthorized reproduction of this program as well as
 *   unauthorized preparation of derivative works based upon the
 *   program or distribution of copies by sale, rental, lease or
 *   lending are violations of federal copyright laws and state trade
 *   secret laws, punishable by civil and criminal penalties.
 *
 ****************************************************************/ include <stdio.h>
include <string.h>
#include <stdlib.h>
#include <conio.h>
#include <fcntl.h>
```

```c
#include <sys/stat.h>
#include <share.h>
include <io.h> if defined( NDS_STUFF)
include "ndstools.h"
endif   /* NDS_STUFF */ include "upmaclib.h"
include "largemsg.h"
/*******************************************************************/
/* Simple string class: used to automatically delete string
 * storage when SimpleString object goes out of scope
 * Caller must guarantee that string passed to constructor
 * was allocated with 'new' (because the destructor frees it
 * with 'delete').
 *
 */ class SimpleString {
        char *string;
public:
        SimpleString( char *s) : string( s) {}
        ~SimpleString() { delete[] string; } operator char*() { return string; }
};

/************************************************/
/* Class to manage usage of a 'FILE *' and ensure that
 * the file is closed when it's no longer needed
 * (the enclosing object goes out of scope).
 */
class FilePtr {
        FILE *p;
public:
        FilePtr( const char *name, const char *mode) {
            p = fopen( name, mode);
        }
        FilePtr( FILE *pp) : p( pp) {}
        ~FilePtr() { if ( p) (void)fclose( p); }
        operator FILE *() { return p; }
};

/************************************************/
/* Make an entry in the bootconf.sys file named by 'pathName'.  The
 * string
 * 'nodeString' is the 12-digit HEX-ASCII node number.
```

```
 * If the entry is already present, overwrite it.  Otherwise, make a
 *   new entry at the bottom.
 *
 *        Return ZERO on success, else nonZero.
 *
 */ int
UpdateMACInBootConfSys( int useAlias, char *pathName, char
*nodeString, char *alias)
{
        long curpos;         /* points to current position in file */
        long previousCurpos;
        char tempBuffer[80];
        SimpleString MACBuffer( new char[ strlen( nodeString) + 1]);

if ( MACBuffer == NULL) {
            /* Unable to allocate string. */
            return -1;
        }
        strcpy( MACBuffer, nodeString);
        (void)strupr( MACBuffer);

/* Read names of workstations and address from file */

/* Open file.
         */

FilePtr filePtr( pathName, "r+");
        if ( filePtr == NULL) {
            return -2;       /* File doesn't exist? */
        } printf("\n\nSearching database in file '%s'.....",
            pathName);
        curpos = previousCurpos = ftell(filePtr);
/* keep track of current file position */
        while (fgets(tempBuffer, 80, filePtr)){
            if (!strnicmp(MACBuffer, &tempBuffer[2], 12))
/* position found? */
            {
                printf("\n\nFound MAC address in '%s' file\n",
                    pathName);
                return(0);
            }
            else {           /* position not found */
                previousCurpos = curpos;
/* keep track for later use */
                curpos = ftell(filePtr);/* update file postion */
            }
```

```
            }
        /*****  Position not found, add it and return*****/
#define WRITE_LINE( filePtr, useAlias, MACBuffer, alias)\
do {                                                   \
        if ( useAlias) {                               \
                fprintf(filePtr, "0x%s = donothing.bat boot=c %s\n",
strupr(MACBuffer), alias);                             \
        }                                              \
        else {                                         \
                fprintf(filePtr, "0x%s = net$dos.sys boot=c\n",
strupr(MACBuffer));                                    \
        }                                              \
} while (0)

/* If the line "0x* = update.sys boot=f" is the last line in the
 * file, lets keep it there (put the new MAC address in and re-write
 * the "0x* = " line at the end of the file.  Otherwise, just put
 * the new MAC address at the end of the file.
 */
        if (fseek(filePtr, previousCurpos, SEEK_SET) == 0) {
                fgets(tempBuffer, 80, filePtr);/* get line from file */ if (!strnicmp("0x*", tempBuffer, 3)) {/* 0x* last line
                        in file */
                        fseek(filePtr, previousCurpos, SEEK_SET);
/* jump back before writting */
                        WRITE_LINE( filePtr, useAlias, MACBuffer, alias);
                        fprintf(filePtr, "0x* = update.sys boot=f");
                }
                else {
                        fseek(filePtr, 0, SEEK_CUR);
/* get ready for output */
                        WRITE_LINE( filePtr, useAlias, MACBuffer, alias);
                }
        }
        else {
                printf("\n\nError seeking back into '%s' file.",
pathName);
        } printf("\n\nMAC Address was added to '%s' file\n\n",
                pathName);
        return(0);
}
/*****************************************************************/
/* Object to create and delete a semaphore file.
 * The constructor attempts to exclusively create
```

```
 * the named file.  If the file already exists,
 * the pathName is NOT saved (and callers can discover
 * the failure via the "creationFailure" member function).
 * If the semaphore file WAS created, it will be automatically
 * removed when the object is destroyed (the constructur
 * will unlink() the file).
 *
 * The member "creationFailure" can be used after construction
 * to determine if the file was created successfully.
 *
 */
class SemaphoreFile {
        char *pathName;
public:
        SemaphoreFile( char *path);
        ~SemaphoreFile();
        int creationFailure() { return pathName == NULL; }
};

SemaphoreFile::SemaphoreFile( char *path)
{
        int fd;

fd = sopen( path,
                        (  O_WRONLY
                         | O_CREAT
                         | O_EXCL),
        /* Fail if we can't create the file. */
                        SH_DENYRW,
                        S_IREAD | S_IWRITE);
        if ( fd < 0) {
fprintf( stderr, "sopen() failure: filename '%s'.\n", pathName);
fflush( stderr);
getche();
                pathName = NULL;
        /* Failed to create the file exclusively. */
        }
        else {
                (void)close( fd);/* Done with the file descriptor. */
                pathName = path;/* Record name of created file. */
        }
}

SemaphoreFile::~SemaphoreFile()
{
        if ( pathName) {
                (void)unlink( pathName);
        }
}
```

```
/*****************************************/
/* Update an entry in the "nodename alias" file named by 'pathName'.
 * 'nodeString' is a 12-digit HEX-ASCII representation of the node
 * number.  We prompt the user to enter the object name.
 *
 *         Return ZERO on success, else nonZero.
 *
 */ int
UpdateMACInNodeNameFile( char *pathName, char *nodeString, char
*objectName)
{
          char *lastSlash;
          const char * const semaphoreFileRootName = "\\upmac.sem";

/* Figure out the full name for the semaphore file.  This
           * requires us to keep any preceding path components.
           */
          SimpleString semaphoreFileName( new char[ strlen( pathName)
                              + 1 /* space for NUL-terminator */
                              + sizeof( semaphoreFileRootName)]);
          if ( semaphoreFileName == NULL) {
              return -1;
          }
          strcpy( semaphoreFileName, pathName);

/* Figure out where to tack on semaphore file root name. */
          lastSlash = strrchr( semaphoreFileName, '\\');
          if ( lastSlash) {
              /* Chop the string on the last slash. */
              *lastSlash = '\0';
          /* Append the semaphore file name (and separating slash). */
              strcat( semaphoreFileName, semaphoreFileRootName);
          }
          else {
/* There is NO slash, so there's no path component to preserve.
 * Copy the root name directly, but SKIP the slash prefix.
 */
              strcpy( semaphoreFileName, &semaphoreFileRootName[ 1]);
          }

/* Create semaphore file object -- this creates the semaphore file
 * exclusively if possible (and automatically deletes the file
 * when the SemaphoreFile object goes out of scope).
 */
          SemaphoreFile semaFile( semaphoreFileName);
/* Create semaphore file. */
          if ( semaFile.creationFailure()) {
              return -2;
```

```
/* Unable to create the file exclusively. */
        }

/* WHEW! Now that the semaphore file has been created, we can get down
 * to REAL business.  Search the nodename file to see if there's a
 * match between node string and the object name.
 */

/* Read names of workstations and address from file */

/* Open file.
        */
        FilePtr filePtr( pathName, "r+");
        if ( filePtr == NULL) {
                return -3;      /* Perhaps the file doesn't exist? */
        } char tempBuffer[ 80];

while (fgets(tempBuffer, 80, filePtr)){ if (!strnicmp(nodeString, &tempBuffer[2], 12))
/* position found? */
                {
                        printf("\n\nFound MAC address in node name file
                                '%s'.\n", pathName);
                        return(0);
                }
        }

/***   Position not found, add it and return**/ fseek(filePtr, 0, SEEK_CUR); /* get ready for output */
        fprintf(filePtr, "0x%s %s\n", nodeString, objectName);

printf("\n\nMAC Address was added to '%s' file\n\n",
                pathName);
        return(0);
}

/******************************************************************/
/* Update a "computer" object in NDS.  'netAddress' is the 12-byte
 * IPX address for the node.
 * We prompt the user for the object name.
 *
 *      Return ZERO on success, else nonZero.
 *
 */ if defined( NDS_STUFF)
```

```
int
UpdateMACInNDS( BYTE *netAddress, char *objectName)
{
        int                    ccode;
        NWDSContextHandle      dContext;
        int                    totalObj;
        const int              MAX_NAMES = 10;
        char                   namesFound[ MAX_NAMES] [ MAX_DN_CHARS];
        LONG                   cx_flags;
        BYTE                   nodeOnly[ 12];
        BYTE                   blankAddress[ 12] = { 0, 0, 0, 0, 0, 0,
0, 0, 0, 0, 0, 0};
        Net_Address_T          NetworkAddress;
        Net_Address_T          BlankNetworkAddress;
        char                   tempBuffer[ 12];
        int                    i;
        int                    oldMatch = FALSE;

InitNDSTools();   /* Make sure unicode is configured, etc. */

/* Zap the NETWORK and SOCKET fields in the net address. */
        memcpy( nodeOnly, netAddress, 12);
        nodeOnly[ 0] = nodeOnly[ 1] = nodeOnly[ 2] = nodeOnly[ 3] = 0;
        nodeOnly[ 10] = nodeOnly[ 11] = 0xff;

/* Setup the special Net_Address_T thingies. */
        NetworkAddress.addressType = 0;
        NetworkAddress.addressLength = 12;
        NetworkAddress.address = nodeOnly;

BlankNetworkAddress.addressType = 0;
        BlankNetworkAddress.addressLength = 12;
        BlankNetworkAddress.address = blankAddress;

/* Create a context that uses typeless names. */
        dContext = NWDSCreateContext();
        if ( (int)dContext == ERR_CONTEXT_CREATION) {
            return -1;
        }
        ccode = NWDSGetContext( dContext, DCK_FLAGS, &cx_flags);
        if ( ccode) {
            goto cleanup_and_exit;
        }
        cx_flags |= DCV_TYPELESS_NAMES;
        ccode = NWDSSetContext( dContext, DCK_FLAGS, &cx_flags);
        if ( ccode) {
            goto cleanup_and_exit;
        }

// search for matching MAC addresses
```

```
            do { /* Keep repeating this loop until
                  * we're sure there are not more names
                  * to be found (we know this is true
                  * when the total object count found by
                  * SearchForMAC() is NOT equal to
                  * MAX_NAMES. (If the total object count
                  * IS equal to MAX_NAMES, that means
                  * SearchForMAC might have stopped before
                  * returning all names, so we need to
                  * go back and search again after we've
                  * changed the first objects to NOT match
                  * any more.
                  * Note that in the USUAL case, there will
                  * only be one or two matching objects in the
                  * namebase, so this loop will only be
                  * executed ONCE.
                  */
totalObj = SearchForMAC(dContext, nodeOnly, MAX_NAMES, namesFound);
            if (totalObj == -1) {// we had an error, exit
                printf("\n\nError in Search engine.");
                exit(0);
            } if (totalObj == 0) {// No matching machine found
                // Create NDS object
                ccode = CreateNDSObject(dContext, objectName);
                if (ccode < 0 && ccode !=
                    ERR_ENTRY_ALREADY_EXISTS) {
            printf("\nError Creating NDS Object %s", objectName);
                    exit(0);
                }

// Update MAC address in object.

ccode = SetNDSObjectValue( dContext,
                    objectName,
                    "Network Address",
                    SYN_NET_ADDRESS,
                    &NetworkAddress);
                if (ccode < 0) {
                printf("\nError Setting new address value.");
                    exit(0);
                }
            }
            else {
// There exists one OR MORE object with matching mac addresses.
                if (totalObj > 1) {// Found too many matches!
#if 0
```

```
                                    // Display error message
                                    DisplayLargeMsg(0,"Duplicates");
                                    printf("\nTotalObjects = %d", totalObj);
                                    for (i=0; i<totalObj; i++) {
                                        printf("\nObject %d = %s", i, namesFound[i]);
                                    }
                                    printf("\n");
#endif
                                }
                                else {
                                    for (i=0; i<totalObj; i++) {
                                        DisplayLargeMsg(1, "    Found");
                                        sprintf(tempBuffer, "    %s", namesFound[i]);
                                        DisplayLargeMsg(0, tempBuffer);
                                    }
                                }

// Clear out all of the existing objects
                                for (i=0; i<totalObj; i++) {
                                    if (strcmpi(namesFound[i], objectName)) {
                                        ccode = SetNDSObjectValue(dContext,
                                            namesFound[i],
                                            "Network Address",
                                            SYN_NET_ADDRESS,
                                            &BlankNetworkAddress);
                                        if (ccode < 0) {
                                    printf("\nError deleting old address values.");
                                            exit(0);
                                        }
                                    }
                                    else {
                                        oldMatch = TRUE;
                                    }
                                }
// if our new position matches an old one, lets not create it if (oldMatch != TRUE) {

// Create NDS Object ccode = CreateNDSObject(dContext, objectName);
                                if (ccode < 0 && ccode != ERR_ENTRY_ALREADY_EXISTS) {
                                printf("\nError Creating NDS Object %s -> Code = %d",
                                        objectName, ccode);
                                            exit(0);
                                    }
                                }

// Update Mac address in object
```

```
                    ccode = SetNDSObjectValue(dContext,
                            objectName,
                            "Network Address",
                            SYN_NET_ADDRESS,
                            &NetworkAddress);
                    if (ccode < 0) {
                        printf("\nError Setting new address value.");
                        exit(0);
                    }
                }

/* Repeat until we know that we haven't missed anything. */
        } while ( totalObj == MAX_NAMES);

ccode = 0;      /* SUCCESS */
        /* Fall-thru to cleanup_and_exit clean up the context. */ cleanup_and_exit:
        (void)NWDSFreeContext( dContext);
        return ccode;
} endif    /* NDS_STUFF */

/****************************************************************/
/****************************************************************
*
*   (C) Copyright 1996 KeyLabs, Inc.
*   All Rights Reserved.
*
*   This program is an unpublished copyrighted work which is
*   proprietary to KeyLabs, Inc. and contains confidential
*   information that is not to be reproduced or disclosed to any
*   other person or entity without prior written consent from KeyLabs,
*   Inc. in each and every instance.
*
*   WARNING: Unauthorized reproduction of this program as well as
*   unauthorized preparation of derivative works based upon the
*   program or distribution of copies by sale, rental, lease or
*   lending are violations of federal copyright laws and state trade
*   secret laws, punishable by civil and criminal penalties.
*
****************************************************************/ include <stdio.h>
include <string.h>
#include <stdlib.h>
#include <dos.h>
#include <conio.h>
#include <ctype.h>
```

```
#include <assert.h>
#include <stdarg.h>
#include <time.h>
#include <errno.h>
include <dir.h> define NWDOS
include <nwipxspx.h> if defined( NDS_STUFF)
include "ndstools.h"    /* Grab kevin's NDS library. */
endif      /* NDS_STUFF */ include "upmaclib.h"    /* Grab MAC-address maintenance library. */
include "largemsg.h"    /* Grab large-message library. */

/****************************************************************/
/* Program constants: */ const BYTE SYSID_BOOTPROD = 0xfe;
/* SysID assigned to first partition when we really
                              * want a "production" boot.
                              */
const BYTE SYSID_INVALID = 0xf0;/* SysID that gets stamped in the
                              * automation partition in order to
                              * "hide" the automation partitoin
                              * when booting "production".
                              */
const BYTE SYSID_FAT12 = 0x01;/* SysID for DOS 12-bit FAT. */ const char BootConfFile[]    = "BOOTCONF.SYS";
const char NodeNameFile[]    = "NODENAME.TXT";

const char BootWorkFile[] = "BOOTWORK.DAT";

unsigned _stklen = 32768U;    /* Minimum 32K stack. */ if defined( NDS_STUFF)

/* read_NDS() searches for this object to make sure it's in the right
 * context. (If the object isn't there, we assume we're NOT connected
 * to a LAB server and thence force a production boot.)
 */
const char    FlagObject[] = "BootWorkContextFlag";

#else
const int MAX_DN_CHARS = 254;
#endif      /* NDS_STUFF */

/****************************************************************/
```

39

```
/* GLOBAL data. */

IPXAddress    ipxAddr;   /* Our MAC address is in the node field. */
char          nodeString[ 20];
              /* String containing HEX digits of node number. */ char *progName = "??Unknown Program Name??";

int     do_hard_reboot = 0;  /* Controls whether reboot() exits with code 100
                              * (triggering the autoexec.bat to unload LAN drivers
                              * and use int 19h to reboot),
                              * OR issues RESET by jumping to processor
                              * reset vector. (-hr option)
                              */ int pause_before_production_boot = 0;
                             /* Controls whether or not we pause for
                              * a few seconds before booting the
                              * production partition (-p option).
                              */
/****************************************************************/
/* Return values for functions which search
 * for automation control data.
 */ typedef enum {
        NO_INPUT_FILE = 1,
        AUTOMATION_WAS_EXECUTED,
        BOOT_PRODUCTION,
        INVALID_AUTOMATION_DATA,
        NO_SPECS_FOUND,
        SYSTEM_ERROR
} Automation_Result;

/****************************************************************/
/* Handy macros. */ define ASSERT( x )   assert( x)

/****************************************************************/
/* Forward declarations: */ void    add_NDS_MAC_data( void);

/****************************************************************/
```

```
void
inform( FILE *output_stream, char *format, ...)
{
        va_list   args;

va_start( args, format);

vfprintf( output_stream, format, args);
        fflush( output_stream);
}
/******************************************************************/ define INFORM_PROGRAMMER_ERROR(s)\
do {                              \
        inform( stderr, "Programmer error in file %s, line %d.\n",\
                        __FILE__, __LINE__ - 3 /* offset from
macro beginning */ );             \
        inform s ;                \
} while (0)
/******************************************************************/
/* This function is required by kevin's ndstools library.
 *
 */ if defined( NDS_STUFF)

extern "C"
void
LogError( int errCode, char *errMessage)
{
        inform( stderr, "LogError: errCode:  %d\n", errCode);
        inform( stderr, "          Message: '%s'\n", errMessage);
} endif    /* NDS_STUFF */
/******************************************************************/
/* Flush the keyboard input buffer.
 */ void
flush_keyboard()
{
        while (kbhit()) {
                (void)getch();
        }
}
```

```
/****************************************************************/
/* DOS critical error handler--this forces a "retry" operation.
 *
 */ pragma argsused    /* Get rid of warning about unused args in next
function. */ int
OurCriticalErrorHandler(int errval, int ax, int bp, int si)
{
            static int RetryCount = 0;

delay(500);

gotoxy(40,24);
            if (RetryCount == 0)
                cputs("Retrying file I/O /");
            if (RetryCount == 1)
                cputs("Retrying file I/O -");
            if (RetryCount == 2)
                cputs("Retrying file I/O \\");
            if (RetryCount == 3){
                cputs("Retrying file I/O |");
                RetryCount=-1;
            }

RetryCount++;

hardresume( 1);        /* 0 = Abort,
                                    * 1 = Retry,
                                    * 2 = Ignore.
                                    */ return 1;
}
/****************************************************************/
/* Issue interrupt 19h to reboot the machine.
 *
 * This function never returns.
 */
void
soft_reboot()
{
            _asm int 19h;
}
/****************************************************************/
/* JUMP to processor hard reset vector to reboot the machine.
```

42

```
 *
 * This function never returns.
 */
void
hard_reboot()
{
        /* First set the BIOS POST flag to skip the memory check. */
        _asm mov   ax,40h;    /* AX = BIOS data segment */
        _asm mov   ds,ax;
        _asm mov   word ptr ds:[72h],1234h;/* mark as software reset,
skip mem test */

/* Now RESET! */
        _asm db    0EAh, 0, 0, 0FFh, 0FFh;
              /* JMP FFFF:0000 is what we really mean */
}
/***************************************************************/
/* Reboot the machine.  We do it one of two ways, depending on whether
 * or not the do_hard_reboot flag is set.
 * If do_hard_reboot is set, we physically reset the machine.
 * If do_hard_reboot is NOT set, we exit with code 100, which will
 * cause the autoexec.bat file to unload the LAN drivers and then
 * run a program to perform an INT 19h instruction to try to
 * "boot fast".
 *
 */ void
reboot()
{
        if ( do_hard_reboot) {
             hard_reboot();
        }
        else {
/* Try a softer approach: Just exit with status 100--the autoexec.bat
 * file recognizes this, unloads the LAN drivers, then issues INT 19h
 * to cause a "fast" boot of the production partition.
 */
             exit( 100);
        }
}

/***************************************************************/
/* Read or write a sector of the hard disk into the buffer addressed
 * by seg:offset.
 *
 *      Return 0 if successful, nonZero on errors.
 *
 */
```

```c
typedef unsigned char RW_Cmd;
#define READ_CMD   0x02
define WRITE_CMD 0x03 int
read_or_write_sector( RW_Cmd operation,
                              unsigned short cylinder,
                              unsigned short head,
                              unsigned short sector,
                              unsigned short numSectors,
                              unsigned short segment,
                              unsigned short offset)
{
        union REGS        regs;
        struct SREGS    segregs;

ASSERT( ( cylinder & ~1023) == 0);
        ASSERT( ( head & ~0x00ff) == 0);
        ASSERT( ( sector & ~0x3f) == 0);
        ASSERT( numSectors < 256);

segregs.ds = 0;
        regs.h.dh = (BYTE)head;/* Head number */
        regs.h.dl = 0x80;    /* 0x80 specifies hard disk 0. */
        regs.h.ch = (BYTE)( cylinder & 0xff);
            /* Low 8 bits of cylinder number. */
        regs.h.cl = (BYTE)( ( cylinder & 0x300) >> 2);
            /* Upper 2 bits of cylinder. */
        regs.h.cl |= (BYTE)( sector & 0x3f);
            /* add in the sector bits. */
        regs.h.ah = operation;/* Read or Write command. */
        regs.h.al = (BYTE)numSectors;
            /* Number of sectors to read or write. */ segregs.es = segment;/* ES:BX points to buffer. */
        regs.x.bx = offset;

int86x( 0x13,
                ®s,    /* Input registers. */
                ®s,    /* Output registers. */
                &segregs);/* Segment registers. */ return ( regs.x.cflag
                            ? -1
                            : 0);
}
/*********************************************/
/* Write a sector to the disk. */
```

```
inline
int
write_sector( unsigned short cylinder,
                              unsigned short head,
                              unsigned short sector,
                              unsigned short numSectors,
                              unsigned short segment,
                              unsigned short offset)
{
        return read_or_write_sector( WRITE_CMD,
                              cylinder,
                              head,
                              sector,
                              numSectors,
                              segment,
                              offset);
}
/**********************************************/
/* Read a sector from the disk. */ inline
int
read_sector( unsigned short cylinder,
                              unsigned short head,
                              unsigned short sector,
                              unsigned short numSectors,
                              unsigned short segment,
                              unsigned short offset)
{
        return read_or_write_sector( READ_CMD,
                              cylinder,
                              head,
                              sector,
                              numSectors,
                              segment,
                              offset);
}
/******************************************************************/
/* Read first sector of hard disk into 'buffer'.
 *
 * Return ZERO if successful, anything else on error.
 */ int
read_1st_sector( unsigned short seg, unsigned short offset)
{
        return read_sector( 0,/* cyl */
                              0,/* head */
                              1,/* sector */
```

45

```
                                1,/* numSectors */
                                seg,
                                offset);
}
/******************************************************************/
/* Write 'buffer' to the first sector of the hard disk.
 *
 * Return ZERO if successful, anything else on error.
 */ int
write_1st_sector( unsigned short seg, unsigned short offset)
{
        return write_sector( 0,/* cyl */
                             0,/* head */
                             1,/* sector */
                             1,/* numSectors */
                             seg,
                             offset);
}

/******************************************************************/
/* Set a special cookie in the partition table (recognized by
 * our customized Master-Boot-Record (MBR) code) to force the
 * machine to boot the "production" (active) partition on the
 * next reboot.
 *
 * Then call reboot() to actuate the boot of the production partition.
 */ void
boot_production()
{
/* Here's what we do: Set the "system id" byte of the FIRST
 * partition table entry to SYSID_BOOTPROD.  This is a special
 * signal to our customized Master-Boot-Record (MBR) code which
 * causes it to boot the "active" partition on the next boot (it
 * never boots the FIRST partition, because that's the automation
 * partition).
 */
        static char sector_buffer[ 512];/* Static: keep off stack.
*/
        fprintf( stderr, "Booting production...\n\n");

if ( pause_before_production_boot) {
            time_t expiration_time = time( NULL) + 5;
            inform( stdout,
            "Booting production in five seconds..\n"
```

```c
                    "<HOME> to abort, any other key to stop waiting...\n"
                    "\n");
            flush_keyboard();
            while ( time( NULL) < expiration_time) {
                if ( kbhit()) {
                    if ( getch() == 0x00) {
                        /* Handle 2-character keys (e.g. HOME key) */
                        if ( getch() == 0x47) {/* HOME */
                            inform( stdout,
                    "\n\n<HOME> pressed: Production boot aborted.\n");
                            exit( 1);
                        /* ABORT boot of production partition. */
                        }
                    }
                    inform( stdout,
                            "\n\nBooting now.\n");
                    break;/* Any other key means stop waiting. */
                }
            } if ( read_1st_sector(FP_SEG( sector_buffer),
                                 FP_OFF( sector_buffer))) {
                inform( stderr,
                            "READ of MBR sector FAILED.\n\n"
                            "Press any key to exit:");
                flush_keyboard();
                getch();
                exit( 1);
            }

/* First partition sysid byte is at sector_buffer[ 0x1be + 4] */ sector_buffer[ 0x1be + 4] = SYSID_BOOTPROD;

if ( write_1st_sector( FP_SEG( sector_buffer),
                                   FP_OFF( sector_buffer))) {
                inform( stderr,
                            "WRITE of MBR sector FAILED.\n\n"
                            "Press any key to exit:");
                flush_keyboard();
                getch();
                exit( 1);
            }

/* We've now changed the sysid byte of the FIRST partition to
     * SYSID_BOOTPROD.
     * Nothing left to do but reboot.  The MBR code will recognize
     * the special SYSID value and know to boot the production
```

```
 * partition.
 */
            reboot();
}
/****************************************************************/
/* Information about drives. */ static enum { INIT_UNKNOWN, INIT_YES, INIT_NO } driveinfo_initialized
= INIT_UNKNOWN;
static BYTE far *dir_info = (BYTE far *)NULL;
static unsigned int currdir_size;
static BYTE             last_drive;

void
setup_drive_stuff()
{
            if ( driveinfo_initialized == INIT_UNKNOWN) {
                unsigned int   drv_ofs, lastdrv_ofs;

/* OS version must be 3.x or greater
                 * because current directory structure not available
                 * in DOS 1.x or 2.x.
                 */
                if ( _osmajor < 3) {
                    driveinfo_initialized = INIT_NO;
                    return;
                }
/* Compute offsets into list of lists--values differ for DOS 3.0. */
                if ( _osmajor == 3 && _osminor == 0) {
                    drv_ofs = 0x17;
                    lastdrv_ofs = 0x1b;
                }
                else {
                    drv_ofs = 0x16;
                    lastdrv_ofs = 0x21;
                }

_asm    push si;    /* needs to be preserved */

/* get DOS list of lists into ES:BX */
                _asm    mov ah, 52h;
                _asm    int 21h;

/* get LASTDRIVE byte */
                _asm    mov si, lastdrv_ofs;
                _asm    mov ah, byte ptr es:[bx+si];
                _asm    mov last_drive, ah;
```

```c
            /* get current directory structure */
    _asm    mov si, drv_ofs;
    _asm    les bx, es:[bx+si];
    _asm    mov word ptr dir_info+2, es;
    _asm    mov word ptr dir_info, bx;

_asm    pop si;

/* Size of curdir structure changed after dos 4.x */
            currdir_size = ( _osmajor >= 4) ? 0x58 : 0x51;

driveinfo_initialized = INIT_YES;
        }
}
/***************************************************************/
/* Retrieve DOS "current directory" structure for a drive.
 *
 */

BYTE far *
currdir( unsigned int drive_index)/* 0..last_drive */
{
        setup_drive_stuff();

if ( driveinfo_initialized != INIT_YES)
            return (BYTE far *)NULL;

if ( drive_index >= last_drive)
            return (BYTE far *)NULL;

return &dir_info[ drive_index * currdir_size];
}
/***************************************************************/
/* Structures and values in the swap_drives functions.
 *
 */

/* Partial header structure for curdir structures.  We define only
 * enough to get us to the 'flags' field (because this is all we need
 * to verify that the entry is valid).
 */
#pragma pack(1)
typedef struct {
        BYTE current_path[ 67];
        WORD flags;
} CURDIR_PARTIAL_HEADER;
#pragma pack()
```

```c
/* values for 'flags' */
const unsigned int NETWORK_DRIVE= ( 1 << 15);
const unsigned int PHYSICAL_DRIVE= ( 1 << 14);
const unsigned int JOIN_DRIVE = ( 1 << 13);
const unsigned int SUBST_DRIVE= ( 1 << 12);
const unsigned int REDIR_NOT_NET=( 1 << 6);/* AKA CDROM */

/****************************************************************/
/* These two variables save information between the time
 * move_c_drive_to_end() is called and restore_c_drive_from_end()
 * is called.  The info is used by restore_c_drive_from_end() to
 * restore the original drive slots.
 */ static      unsigned int    drives_rearranged = 0;
static      unsigned int    munged_C_slot = -1;

/****************************************************************/
/* MOVE the C: drive to the END of the physical drives, and slide all
 * other physical drives DOWN to fill the hole at the bottom.
 *
 */ void
move_c_drive_to_end()
{
        setup_drive_stuff();

if ( driveinfo_initialized != INIT_YES) {
              inform( stderr, "Unable to get drive information.\n");
              exit( 1);
        }

/* Find the LAST physical drive.  Start searching at index 2, which
 * is the C: drive (A: is 0, B: is 1, C: is 2, etc).
 */
        unsigned int drive;
        CURDIR_PARTIAL_HEADER far *cph;

for ( drive = 2 ; drive <= last_drive ; drive++) {
              cph = (CURDIR_PARTIAL_HEADER far *)currdir( drive);
              if ( cph == NULL) {
                    break;    /* Invalid slot found. */
              }

/* Stop searching if we find an invalid drive. */
              if ( ! cph->flags)
                    break;

/* Stop searching if we find a NETWORK drive. */
```

```c
                if (    (cph->flags & NETWORK_DRIVE)
                        && ( ! ( cph->flags & REDIR_NOT_NET))) {
                    break;
                }
        }
        /* 'Drive' contains the index of either the first NETWORK
         * drive, or the first nonexistent drive, or 1+last_drive.
         * In any case, (drive-1) is the
         * last physical drive.  We want the C: drive to
         * go into slot (drive-1), and we want all drives from
         * 'D:' (3) up to (drive-1) to slide down a slot.
         */
        int new_slot_for_C = drive - 1;

BYTE temp_CDS_buf[ 0x58];
        BYTE far *to;
        BYTE far *from;

if ( new_slot_for_C == 2) {
            drives_rearranged = 0;
            return;
            /* No need to go through all the gyrations, because
             * C: is the ONLY drive!
             */
        }
inform( stderr, "NEW slot for C is '%d' ('%c')\n", new_slot_for_C,
new_slot_for_C + 'A');

_disable();
            /* NO INTs while we're messing around here! */ from = currdir( 2); /* Get the C: drive. */
        if ( from == NULL) {
            _enable();
            inform( stderr, "Unable to get current directory
pointer for drive C:\n");
            exit( 1);
        }
        /* Save the curdir values for the C: drive. */
        _fmemmove( temp_CDS_buf, from, 0x58);

/* Now slide all the other drives DOWN to fill the 'empty' C: slot. */
        for (   drive = 3       /* Start at drive D: */
                ; drive <= new_slot_for_C
                ; drive++) {
            from = currdir( drive);
            to = currdir( drive - 1);
            if ( from == NULL || to == NULL) {
                /* DOS is probably hosed. */
```

51

```
                    goto fatal_error;
            }
            _fmemmove( to, from, 0x58);
    }

/* Now copy the C: structure to the last slot. */
    to = currdir( new_slot_for_C);
    if ( to == NULL) {
        /* This is BAD */
        goto fatal_error;
    }
    _fmemmove( to, temp_CDS_buf, 0x58);

/* DONE! */
    _enable();

/* Save information so we can UNDO it all. */
    drives_rearranged = 1;
    munged_C_slot = new_slot_for_C;

return;

fatal_error:
    _enable();
    inform( stderr,
                "FATAL ERROR while rearranging drives.\n"
                "Hit any key to REBOOT!");
    (void)getch();
    hard_reboot();
}
/****************************************************************/
/* Restore the C: drive from its repositioned spot at the END of the
 * physical drives to the BEGINNING of the list, where it belongs.
 *
 */ void
restore_c_drive_from_end()
{
    if ( ! drives_rearranged) {
        return;
    /* No need to restore what ain't been messed up! */
    } setup_drive_stuff();

if ( driveinfo_initialized != INIT_YES) {
        inform( stderr, "Unable to get drive information.\n");
        exit( 1);
```

```
            }
            unsigned int drive;
            BYTE temp_CDS_buf[ 0x58];
            BYTE far *to;
            BYTE far *from;

_disable();
            /* NO INTs while we're messing around here! */ from = currdir( munged_C_slot);
            if ( from == NULL) {
                _enable();
                inform( stderr, "Unable to get current directory
                    pointer for drive C:\n");
                exit( 1);
            }
            /* Save the curdir values for the C: drive. */
            _fmemmove( temp_CDS_buf, from, 0x58);

/* Now slide all the other drives UP to make room for drive C: in its
            original slot. */
            for ( drive = munged_C_slot/* Start at end */
                    ; drive > 2
                    /* Keep going until we pull them all UP. */
                    ; drive--) {
                from = currdir( drive - 1);
                to = currdir( drive);
                if ( from == NULL || to == NULL) {
                    /* DOS is probably hosed. */
                    goto fatal_error;
                }
                _fmemmove( to, from, 0x58);
            }

/* Now copy the C: structure to its original location. */
            to = currdir( 2);
            if ( to == NULL) {
                /* This is BAD */
                goto fatal_error;
            }
            _fmemmove( to, temp_CDS_buf, 0x58);

/* DONE! */
            _enable();

/* Drives not messed up anymore. */
            drives_rearranged = 0;

return;
```

```
fatal_error:
        _enable();
        inform( stderr,
                        "FATAL ERROR while rearranging drives.\n"
                        "Hit any key to REBOOT!");
        (void)getch();
        hard_reboot();
}

/*******************************************************************/
/* Run a command.  Before running it, rearrange drive letters to make
 * it appear as though we're running the original "production"
 * partition table.  We do this by rotating the physical drive letters
 * (starting at "C:") so that the automation partition rotates to the
 * end of the physical drives and all others slide "down" a slot.  We
 * also setup COMSPEC to point to the command.com on the automation
 * partition (in its new position at the end of the physical drives).
 */ int
run_command_line_with_production_drive_letters( char *command_line)
{
        int ccode;

/* putenv() requires this to be static */
        static char comspec[80] = "COMSPEC=?:\\COMMAND.COM";

move_c_drive_to_end();
        if ( drives_rearranged) {
            sprintf( comspec, "COMSPEC=%c:\\COMMAND.COM", 'A' +
                    munged_C_slot);
            if ( putenv( comspec)) {
                    /* ERROR changing environment. */
                    inform( stderr, "putenv() failure.\n");
                    restore_c_drive_from_end();
                    return -1;
            }
            inform( stderr, "Set COMSPEC to '%s'\n", comspec);
        } inform( stdout, "-- START ---------------------------
        ---------\n");
        inform( stdout, "-- '%s' --\n", command_line);
        ccode = system( command_line);
        inform( stdout, "\n-- END     ---------------------------
        -----------\n");
        if ( ccode) {
            inform( stderr, "An error occurred, errno is: ");
            switch( errno) {
            case ENOENT:
```

```
                    inform( stderr, "ENOENT\n"); break;
            case ENOEXEC:
                    inform( stderr, "ENOEXEC\n"); break;
            case ENOMEM:
                    inform( stderr, "ENOMEM\n"); break;
            default:
                    inform( stderr, "%d\n", errno); break;
            }
        } restore_c_drive_from_end();

return ccode;
}
/****************************************************************/
/* Return true if the name has the form IMAGE_xx.SYS, where 'xx is a
 * one or two digit number from 0 to 99.  Also set *image_number to
 * the number 'xx'.
 *
 * Return ZERO if the name doesn't match the expected form.
 *
 */ int
image_match( char *imagename, int *image_number)
{
        /* The imagename is presumed to be of the form
         * "IMAGE_xx.SYS", where 'xx' is a one or two digit
         * number from from 0 to 99.
         * (note that CASE is ignored)
         */ if (  memicmp( imagename, "IMAGE_", 6)) {
            /* First part of name doesn't match. */
            return 0;
        } if (    isdigit( imagename[ 6])
                    && ! isdigit( imagename[ 7])) {
            /* Number is a single digit. */
            if ( memicmp( &imagename[ 7], ".SYS", 4)) {
                return 0;
            }

*image_number = imagename[ 6] - '0';
        }
        else if (   isdigit( imagename[ 6])
                            && isdigit( imagename[ 7])) {
            /* Number is two digits. */
```

```
            if ( memicmp( &imagename[ 8], ".SYS", 4)) {
                return 0;
            }

*image_number = (   ( 10 * ( imagename[ 6] - '0'))
                              + ( imagename[ 7] - '0'));
        }
        else {
            /* numeric part of image name doesn't match. */
            return 0;
        } return 1; /* Success. */
}
/*******************************************************************/
/* Run some form of automation program.  The 'imagename' is the second
 * parameter from the BOOTCONF.SYS file for this machine.  When we're
 * done, we return (in case of errors, we call exit()).
 */ void
run_automation( char *imagename)
{
        int image_number;
        static char command_line[ 512];/* static: keep off stack. */ if ( image_match( imagename, &image_number)) {
            sprintf( command_line, "batch%d.bat", image_number);
        }
        else {
            /* Name should be a .bat file. */
            char *dot = strchr( imagename, '.');
            if ( dot == NULL) {
                goto illegal_name;
            }
            if ( ( dot - imagename) > 8) {
                /* Base part of name too long. */
                goto illegal_name;
            }
            if ( memicmp( dot, ".BAT", 5)) {
                /* Four chars plus 'NUL' at end. */
                goto illegal_name;/* Extension is not ".bat". */
            }
            /* The name has proper form for a batch file. */
            strcpy( command_line, imagename);
        } inform( stderr, "Calling BATCH file '%s'\n", command_line);
```

```
                if ( run_command_line_with_production_drive_letters(
                    command_line)) {
                    exit( 1);
                } inform( stderr, "AUTOMATION FINISHED\n");
                return;

illegal_name:
                inform( stderr, "ILLEGAL image name '%s'\n", imagename);
                exit( 1);
}

/******************************************************************/
/* Function to scan the BOOTCONF.SYS file and potentially run some
 * kind of automation (based on the contents of the "image name" field
 * in the BOOTCONF.SYS file).
 *
 * OPERATION:
 *      1. Open the specified file.  If the file can't be opened,
 *         return.
 *      2. Read each line of the file (assumed to be coming from
 *            BOOTCONF.SYS)
 *         looking for a matching mac address entry.
 *      3. If a match is found, check the "boot drive" field.If it's
 *         set to 'c', we boot the production partition on the disk.
 *         If the "boot drive" field is 'f', we run some kind of
 *            automation program determined by the "image name"
 *            field of the matching BOOTCONF.SYS file.
 *
 *         If the "boot drive" is neither 'c' nor 'f', we assume
 *         something's wrong, so we return.
 *      4. If a matching entry is NOT found in the BOOTCONF.SYS file
 *         (stdin), we return.
 */

Automation_Result
read_bootconf( const char *fileName)
{
            FILE *input_file;
            static char linebuf[ 512];/* static: keep off stack */
            static char imagename[ 512];/* static: keep off stack */
            int macAddr_ints[ 6];
            char macAddr[ 6];
            char bootdrive;
            char *newLine;
            int numMatched;
            int i;
#if defined( HANDLE_WILDCARD_ENTRY)
            long curpos;
```

```
            long previousCurpos;
#endif
            input_file = fopen( fileName, "r");
            if ( input_file == NULL) {
            fprintf( stderr, "Unable to open file '%s'\n", fileName);
                return NO_INPUT_FILE;
            }
/* Read the file searching for a match against our mac address.
 * We assume the file is BOOTCONF.SYS file from an appropriate
 * SYS:LOGIN directory.
 */
#if defined( HANDLE_WILDCARD_ENTRY)
            curpos = previousCurpos = 0L;
#endif
            while ( fgets( linebuf, 512, input_file)) {
                /* Update pointers to previously-read line. */
#if defined( HANDLE_WILDCARD_ENTRY)
                previousCurpos = curpos;
                curpos = ftell( input_file);
#endif
                /* Get rid of trailing newline, if any. */
                newLine = strchr( linebuf, '\n');
                if ( newLine)
                    *newLine = '\0';

#ifdef DEBUG
                fprintf( stderr, "line ");
                for ( newLine = linebuf ; *newLine ; newLine++) {
                    if ( *newLine >= 32 && *newLine < 127)
                        fprintf( stderr, "%c", *newLine);
                    else
                        fprintf( stderr, ".%02x.", *newLine & 0xff);
                }
                fprintf( stderr, "\n");
                fflush( stderr);
#endif
                /* See if the line matches our expectations. */
                numMatched = sscanf( linebuf,
                    "0x%02x%02x%02x%02x%02x%02x = %s boot=%c",
                                &macAddr_ints[ 0],
                                &macAddr_ints[ 1],
                                &macAddr_ints[ 2],
                                &macAddr_ints[ 3],
                                &macAddr_ints[ 4],
                                &macAddr_ints[ 5],
```

58

```c
                                imagename,
                                &bootdrive);
            if ( numMatched != 8) {
#ifdef DEBUG
                fprintf( stderr, "Invalid line '%s' 
encountered.\n", linebuf);
                fflush( stderr);
#endif
                continue;
            }

/* Convert mac address from ints (which we got from sscanf above
 * to unsigned chars (which we use for the memcmp() below.
 */
            for ( i = 0 ; i < 6 ; i++) {
                macAddr[ i] = (char)( macAddr_ints[ i] & 0xff);
            }

/* Check for a matching MAC address. */ if ( memcmp( ipxAddr.node, macAddr, 6) == 0) {
                printf("MATCHED! Drive '%c', Image '%s', "
                    "macaddr %02x%02x%02x%02x%02x%02x\n",
                    bootdrive,
                    imagename,
                    0xff & macAddr[ 0],
                    0xff & macAddr[ 1],
                    0xff & macAddr[ 2],
                    0xff & macAddr[ 3],
                    0xff & macAddr[ 4],
                    0xff & macAddr[ 5]);

/* Close the bootconf.sys file before we reboot and/or exit.
 * Note that this means there can be NO ESCAPE from the
 * enclosing if() {} block, because input_file is going
 * to be INVALID.
 */
                (void)fclose( input_file);

if ( bootdrive == 'c') {
                    return BOOT_PRODUCTION;
                }
                else if ( bootdrive == 'f') {
                    run_automation( imagename);
                    return AUTOMATION_WAS_EXECUTED;
                }
                else {
                    return INVALID_AUTOMATION_DATA;
                }
            }
```

```
                } if defined( HANDLE_WILDCARD_ENTRY)
/* We've read the entire input and no match on our mac address
 * was found.  See if the last line in the file is the special
 * wildcard line.
 * The wildcard line starts with "0x*".  If we find this, we need to
 * run "update.bat".
 */
if (fseek(input_file, previousCurpos, SEEK_SET) == 0) {
/* get line from file */
if ( fgets(linebuf, 512, input_file)) {
if (!strnicmp("0x*", linebuf, 3)) {/* 0x* last line in file? */
/* It matched! IGNORE the rest of the line--we're going to
 * run UPDATE.BAT no matter what (well, assuming it exists...).
 */
                if ( system( "UPDATE.BAT")) {
                    inform( stderr, "\n\nAn ERROR occurred
                        while running UPDATE.BAT: errno is %d\n\n",
                        errno);
                    exit( 1);
                    }
                inform( stderr, "DEFAULT automation finished
                    (UPDATE.BAT).\n");
                        (void)fclose( input_file);
                        return AUTOMATION_WAS_EXECUTED;
                    }
                }
                else {
                inform( stderr, "Error re-reading last line of %s
                    file.\n", fileName);
                }
            }
            else {
                inform( stderr,"\n\nError seeking back into '%s'
                    file.\n\n", fileName);
            }
#endif   /* HANDLE_WILDCARD_ENTRY */

/* Close the input file. */
            (void)fclose( input_file);

fprintf( stderr,
                    "NO MATCHING MAC ADDRESS ENTRY found.\n");

return NO_SPECS_FOUND;
}
/****************************************************************/
/* Function to search for a "flag" object in the given context.
```

```c
 *
 * We assume that the NDS stuff has been initialized (unicode, etc),
 * and that the given context is configured to work with and return
 * typeless names (i.e. DCV_TYPELESS_NAMES is set).
 *
 */ if defined( NDS_STUFF)

typedef enum {
        FSR_Object_Present,    /* Returned if object exists. */
        FSR_Object_NOT_Present,/* Returned if object does NOT exist.
*/
        FSR_Error
/* Returned if we can't tell if it exists or not due to errors. */
} FlagSearchResult;

FlagSearchResult
flag_object_found( NWDSContextHandle dContext)
{
        Object_Info_T    objectInfo;
        nstr8            distinguishedName[ MAX_DN_CHARS];
        int              ccode;

ccode = NWDSReadObjectInfo( dContext,
                        (char *)FlagObject,
                        distinguishedName,
                        &objectInfo);
        switch( ccode) {
        case 0:          /* Object exists. */
            return FSR_Object_Present;

case ERR_NO_SUCH_ENTRY:/* No such entry. */
            inform( stderr,
                        "Flag object '%s' not found.\n",
                        FlagObject);
            return FSR_Object_NOT_Present;

default:  /* All other error codes. */
            inform( stderr,
                "An error occurred while trying to read info on flag
                    object '%s'.\n",
                        FlagObject);
            return FSR_Error;
        }
} endif    /* NDS_STUFF */

/******************************************************************/
```

```
/* Function to scan an NDS container looking for a "computer" object
 * which has a network address matching our MAC address.  If found,
 * run the batch file specified in the "Locality" property of the
 * matching object.
 *
 */ if defined( NDS_STUFF)

Automation_Result
read_NDS()
{
          NWDSContextHandle    dContext;
          LONG                 cx_flags;
          BYTE                 nodeOnlyAddress[ 12];
          int                  ccode;
          Automation_Result    retCode = SYSTEM_ERROR;
          const int            MAX_NAMES = 2;
          static char          namesFound[ MAX_NAMES] [ MAX_DN_CHARS];/*
static == keep off stack */
          char                 commandLine[ MAX_DN_CHARS];
          int                  totalObj;

/* Create a context that uses typeless names. */
          dContext = NWDSCreateContext();
          if ( (int)dContext == ERR_CONTEXT_CREATION) {
              return SYSTEM_ERROR;
          }
          ccode = NWDSGetContext( dContext, DCK_FLAGS, &cx_flags);
          if ( ccode) {
              retCode = SYSTEM_ERROR;
              goto error_exit;
          }
          cx_flags |= DCV_TYPELESS_NAMES;
          ccode = NWDSSetContext( dContext, DCK_FLAGS, &cx_flags);
          if ( ccode) {
              retCode = SYSTEM_ERROR;
              goto error_exit;
          }

/* Set-up the net address */
          memcpy( nodeOnlyAddress, (BYTE *)&ipxAddr, 12);

/* Zap parts of the address we don't care about. */
          nodeOnlyAddress[ 0]
                = nodeOnlyAddress[ 1]
                = nodeOnlyAddress[ 2]
                = nodeOnlyAddress[ 3] = 0;
          nodeOnlyAddress[ 10]
                = nodeOnlyAddress[ 11] = 0xff;
```

62

```
            /* Initialize the Unicode tables, etc. */
            InitNDSTools();

/* Search for "flag" object to make sure we're in the right context.
 * If the "flag" object cannot be found, we assume we're connected to
 * the "wrong" server (i.e. NOT the lab server).  If this is the case,
 * we should boot the production partition (we assume that since we
 * can't find the right context on the Lab server, we're disconnected
 * from the Lab server and shouldn't try to do any automation stuff.
 */
            switch( flag_object_found( dContext)) {
            case FSR_Object_Present:
                break;
            case FSR_Object_NOT_Present:
                retCode = BOOT_PRODUCTION;
                goto error_exit;
            default:
                inform( stderr, "Error in flag_object_found().\n");
                retCode = SYSTEM_ERROR;
                goto error_exit;
            }

/* search for matching MAC addresses */ do {
            totalObj = SearchForMAC(dContext, nodeOnlyAddress,
                MAX_NAMES, namesFound);

if ( totalObj == -1) {
                    /* ERROR */
                    inform( stderr, "SearchForMAC() returned -1.\n");
                    retCode = SYSTEM_ERROR;
                    goto error_exit;
                }
                else if ( totalObj == 0) {
                    /* No matching objects in the namebase. */
                    DisplayLargeMsg( 0, "None Found");
                    inform( stderr,
                            "\n"
                            "No object with matching MAC address
                                found in the namebase!\n"
                            "This requires operator assistance!\n"
                            "\n");
/* Perform steps to create the object for this machine. */
                add_NDS_MAC_data();

/* Go around the loop and try to find the right object again. */
                }
                else if ( totalObj != 1) {
/* More than one matching entry found. */
```

```
                    DisplayLargeMsg( 0,"Duplicates");
                    inform( stderr,
                            "\n"
        "More than one matching object found in the namebase!\n"
                            "This requires operator assistance!\n"
                            "\n");
/* Perform steps to get the RIGHT name for this machine. */
                    add_NDS_MAC_data();

/* Go around the loop and try to find the right object again. */
                }
            } while ( totalObj != 1);

/* Else we found ONE matching object, and its name is in
             * namesFound[ 0].  Now we need to read the Location
             * attribute and see what batch file to run.
             */
inform( stderr, "FOUND matching object named '%s'\n", namesFound[ 0]);

ccode = ReadNDSObjectAttribute( dContext,
                            namesFound[ 0],
                            "L",/* Locality attribute. */
                            commandLine);
            if ( ccode < 0) {
                /* ERROR! */
                inform( stderr, "ReadNDSObjectAttribute() error: ccode
                    %d (0x%x)\n", ccode, ccode);
                retCode = SYSTEM_ERROR;
                goto error_exit;
            } inform( stderr, "FOUND command-line: '%s'\n", commandLine);

if ( ! stricmp( commandLine, "completed")) {
                /* Special flag meaning we have nothing to do. */
                retCode = BOOT_PRODUCTION;
                goto error_exit;
            }

/* Now we have the batch-file name in 'commandLine'. */
            if ( run_command_line_with_production_drive_letters(
                commandLine)) {
                inform( stderr, "Failure while running command.\n");
                retCode = SYSTEM_ERROR;
                goto error_exit;
            } inform( stderr, "AUTOMATION SUCCESSUL (I think!)\n");

retCode = AUTOMATION_WAS_EXECUTED;
```

```
                /* Fall-through to error_exit to clean up. */
error_exit:
                (void)NWDSFreeContext( dContext);
                return retCode;
} endif    /* NDS_STUFF */
/******************************************************************/
/* Get an object name from the console.
 * Return ZERO if OK, nonZero otherwise.
 *
 */ int
GetObjectName( int maxLen, char * name)
{
                char *tmpName = new char[ maxLen];
                if ( tmpName == NULL) {
                        return -1;
                }
                inform( stdout,
                        "\n\nPlease enter the object name [%s]:\n"
                        "\n"
                        "-->",
                        name);
                flushall();
                (void)fgets( tmpName, maxLen, stdin);
                if ( tmpName[ 0] != '\n') {
                    strcpy( name, tmpName);

/* Zap the trailing newline, if present. */
                    char *newLine = strchr( name, '\n');
                    if ( newLine) {
                        *newLine = '\0';
                    }
                }
                else {
                        /* No input, so keep old name. */
                }
                delete [] tmpName;

return 0;
}

/******************************************************************/
/* Prompt the user for an alias name, then make sure the MAC address,
 * alias, and image-file information is recorded in the BootConfFile
 * and in the NodeNameFile.
```

```
 *
 */
void
add_bootconf_MAC_data()
{
          static char objectName[ MAX_DN_CHARS];

do {
              objectName[ 0] = '\0';
              GetObjectName( MAX_DN_CHARS, objectName);
          } while ( strlen( objectName) == 0);

if ( UpdateMACInBootConfSys( 0, (char *)BootConfFile,
              nodeString, NULL)) {
              inform( stderr, "Unable to update %s file.\n",
                  BootConfFile);
          }
          if ( UpdateMACInNodeNameFile( (char *)NodeNameFile,
              nodeString, objectName)) {
              inform( stderr, "Unable to update %s file.\n",
                  NodeNameFile);
          }

}

/*****************************************************************/
/* Prompt the user for an alias name, then make sure the MAC address,
 * alias, and image-file information is recorded in the BootWorkFile.
 *
 */
void
add_bootwork_MAC_data()
{
          static char objectName[ MAX_DN_CHARS];

do {
              objectName[ 0] = '\0';
              GetObjectName( MAX_DN_CHARS, objectName);
          } while ( strlen( objectName) == 0);

if ( UpdateMACInBootConfSys( 1, (char *)BootWorkFile,
              nodeString, objectName)) {
              inform( stderr, "Unable to update %s file.\n",
                  BootWorkFile);
          }
}

/*****************************************************************/
```

```c
/* Prompt the user for an alias name, then create an NDS "Computer"
 * object named 'alias', and make sure the MAC address and image-file
 * information is recorded in object.
 *
 */ if defined( NDS_STUFF)

void
add_NDS_MAC_data()
{
            static char objectName[ MAX_DN_CHARS];

do {
                objectName[ 0] = '\0';
                GetObjectName( MAX_DN_CHARS, objectName);
            } while ( strlen( objectName) == 0);

UpdateMACInNDS( (BYTE *)&ipxAddr, objectName);
} endif     /* NDS_STUFF */

/*******************************************************************/
/* Give the user a chance to abort and force a production boot.
 *
 */ void
give_chance_for_production_boot()
{
            int key;
            time_t    current_time = time( NULL);
            time_t    expiration_time = current_time + 5;

clrscr();
            inform( stdout,
                "Press <HOME> to skip automation checks...\n"
                "\n"
                "Any other key to stop waiting...\n"
                "\n");

flush_keyboard();
            while ( current_time < expiration_time) {
                if ( current_time != time( NULL)) {
                    current_time = time( NULL);
                    inform( stdout, "   %d second(s) remaining...\r",
                            expiration_time - current_time);
                }
                if ( kbhit()) {
```

```
                key = getch();
                if ( key == 0x00) {
        /* Handle 2-character keypresses (e.g. HOME key) */
                    key = getch();
                    if ( key == 0x47) {/* HOME */
                         clrscr();
                         inform( stdout,
    "\n\n<HOME> pressed: Booting production partition.\n");
                         boot_production();
                    }
                }
                break;    /* Any other key == stop waiting. */
            }
        }
        clrscr();
}
/*******************************************************************/
/* Usage: Print usage message.
 */ void
usage()
{
#if defined( NDS_STUFF)
        inform( stderr,
                         "Usage:\n"
                         "\n"
                         "    %s {[-w] | [-b] | [-n]} [-hr] [-p]\n"
                         "\n"
                         "Options:\n"
                         "\n"
                         "    -w  Read %s file\n"
                         "    -b  Read %s file\n"
                         "    -n  Read NDS database\n"
                         "    -hr Use hard reboot to boot
                    production partition\n"
                         "        (i.e. don't try to unload LAN
                    drivers first)\n"
                         "    -p  Pause before booting
                    production\n"
                         "\n",
                         progName,
                         BootWorkFile,
                         BootConfFile);
#else
        inform( stderr,
                         "Usage:\n"
                         "\n"
                         "    %s {[-w] | [-b]} [-hr]\n"
```

68

```
                                "\n"
                                "Options:\n"
                                "\n"
                                "        -w   Read %s file\n"
                                "        -b   Read %s file\n"
                                "        -hr  Use hard reboot to boot
                                     production partition\n"
                                "             (i.e. don't try to unload
                                     LAN drivers first)\n"
                                "        -p   Pause before booting
                                     production\n"
                                "\n",
                                progName,
                                BootWorkFile,
                                BootConfFile);

#endif   /* NDS_STUFF */
}

/******************************************************************/
/* MAIN:
 *
 *       - Initialize IPX.
 *       - Get MAC address - store in global variable.
 *       - Parse command-line args.
 *       - Call "action" function(s) based on command-line args.
 *
 */
void
main( int argc, char *argv[])
{
            Automation_Result   result;
            enum {
                Bootwork,
                Bootconf,
#if defined( NDS_STUFF)
                NDS
#endif      /* NDS_STUFF */
            } searchType;

/*********************************************/
            /* Set the program name, so that usage() will work. */
            progName = argv[ 0];

/* Establish critical error handler: */
            harderr( OurCriticalErrorHandler);

/*********************************************/
```

```
           /* Get our MAC address. */
           if ( IPXInitialize()) {
                inform( stderr, "IPXInitialize failure.\n");
                exit( 1);
           }
           IPXGetInternetworkAddress( (BYTE *)&ipxAddr);
           sprintf(nodeString,
                     "%02x%02x%02x%02x%02x%02x",
                     ipxAddr.node[ 0],
                     ipxAddr.node[ 1],
                     ipxAddr.node[ 2],
                     ipxAddr.node[ 3],
                     ipxAddr.node[ 4],
                     ipxAddr.node[ 5]);
/**********************************************/
/* Check to see if the "current directory" is on a network drive.
 * If it's NOT, assume a "boot server" couldn't be found, and
 * boot the production partition.
 */
/* Get "current directory" structure for current disk. */
           CURDIR_PARTIAL_HEADER far *cph;
           cph = (CURDIR_PARTIAL_HEADER far *)currdir( getdisk());
           if ( cph == NULL) {
           inform( stderr, "ERROR: Unable to get current directory
                info.\n");
           exit( 1);
           }
           if ( ! ( cph->flags & NETWORK_DRIVE)) {
           /* NOT a network drive.  Assume no boot server present. */
                inform( stderr, "Current drive not a NETWORK drive.
                     Booting production...\n");
                sleep( 1);
                boot_production();
           }

/**********************************************/
           /* Parse command-line args. */
           if ( argc < 2) {      /* We need at least one argument. */
                usage();
                exit( 1);
           } int want_bootwork = 0;
           int want_bootconf = 0;
#if defined( NDS_STUFF)
           int want_nds = 0;
endif     /* NDS_STUFF */ for ( int arg = 1 ; arg < argc ; arg++) {

70
```

```
                        if ( ! stricmp( argv[ arg], "-w")) {
#if defined( NDS_STUFF)
                                if ( want_nds || want_bootconf) {
                                        inform( stderr, "Error: must have only one of
'-w', '-b' and '-n'.\n\n");
                                        usage();
                                        exit( 1);
                                }
#else
                                if ( want_bootconf) {
                                        inform( stderr, "Error: must have only one of
'-w' and '-b'.\n\n");
                                        usage();
                                        exit( 1);
                                }
#endif   /* NDS_STUFF */
                                want_bootwork = 1;
                        }
                        else if ( ! stricmp( argv[ arg], "-b")) {
#if defined( NDS_STUFF)
                                if ( want_nds || want_bootwork) {
                                        inform( stderr, "Error: must have only one of
                                                '-w', '-b' and '-n'.\n\n");
                                        usage();
                                        exit( 1);
                                }
#else
                                if ( want_bootwork) {
                                        inform( stderr, "Error: must have only one of
                                                '-w' and '-b'.\n\n");
                                        usage();
                                        exit( 1);
                                }
#endif   /* NDS_STUFF */
                                want_bootconf = 1;
                        }
#if defined( NDS_STUFF)
                        else if ( ! stricmp( argv[ arg], "-n")) {
                                if ( want_bootconf || want_bootwork) {
                                        inform( stderr, "Error: must have only one of
                                                '-w', '-b' and '-n'.\n\n");
                                        usage();
                                        exit( 1);
                                }
                                want_nds = 1;
                        }
#endif   /* NDS_STUFF */
                        else if ( ! stricmp( argv[ arg], "-hr")) {
                                do_hard_reboot = 1;
                        }
```

71

```
            else if ( ! stricmp( argv[ arg], "-p")) {
                pause_before_production_boot = 1;
            }
            else {
            inform( stderr, "Illegal argument '%s'\n", argv[ arg]);
                usage();
                exit( 1);
            }
        }
        /*************************************************/
        /* Give the user a few seconds to hit a special key
         * to force a production boot.
         */
        give_chance_for_production_boot();

/*************************************************/
        /* Search in specified database for boot command info. */ if ( want_bootwork) { searchType = Bootwork;
            result = read_bootconf( BootWorkFile);
        }
        else if ( want_bootconf) { searchType = Bootconf;
            result = read_bootconf( BootConfFile);
        }
#if defined( NDS_STUFF)
        else if ( want_nds) {
            /* Initialize Unicode. */
            if ( InitNDSTools()) {
                inform( stderr, "InitNDSTools failure\n");
                exit( 1);
            } searchType = NDS;
            result = read_NDS();
        }
endif
        else {
            usage();
            exit( 1);
        }
        /*************************************************/
        /* Do something based on the result of the search. */ switch( result) {
```

72

```
            case AUTOMATION_WAS_EXECUTED:
                exit( 0); /* We're done! */
                /* NOTREACHED */ case BOOT_PRODUCTION:
                /* Command to boot the production partition. */
                boot_production();
                /* NOTREACHED */
                break;

case NO_SPECS_FOUND:
                /* We didn't find a record containing our MAC address.
                 * Prompt the user to enter an alias, then make entries
                 * in the appropriate places.
                 */
                DisplayLargeMsg(0,"None Found");
                if ( searchType == Bootwork) {
                    add_bootwork_MAC_data();
                }
                else if ( searchType == Bootconf) {
                    add_bootconf_MAC_data();
                }
#if defined( NDS_STUFF)
                else {
                    add_NDS_MAC_data();
                }
endif
                exit( 0);
                /* NOTREACHED */ case NO_INPUT_FILE:
/* Assume the file is not found because we can't get to
 * the "boot server."  So we should "boot production" in this case.
 */
                boot_production();
                /* NOTREACHED */ case INVALID_AUTOMATION_DATA:
                inform( stderr, "ILLEGAL automation specification.\n");
                exit( 1);
                /* NOTREACHED */ case SYSTEM_ERROR:
                inform( stderr, "'System Error': program stopping.\n");
                exit( 1);
                /* NOTREACHED */ default:
            INFORM_PROGRAMMER_ERROR(( stderr, "Hit default switch.\n"));
                exit( 1);
```

```
                /* NOTREACHED */
        }
        /* NOTREACHED */

INFORM_PROGRAMMER_ERROR(( stderr, "Unexpectedly reached end
                of main().\n"));
        exit( 0);
}
/******************************************************************
 *
 * (C) Copyright 1996 KeyLabs, Inc.
 * All Rights Reserved.
 *
 * This program is an unpublished copyrighted work which is
 * proprietary to KeyLabs, Inc. and contains confidential information
 * that is not to be reproduced or disclosed to any other person or
 * entity without prior written consent from KeyLabs, Inc. in each
 * and every instance.
 * WARNING:  Unauthorized reproduction of this program as well as
 * unauthorized preparation of derivative works based upon the
 * program or distribution of copies by sale, rental, lease or
 * lending are violations of federal copyright laws and state trade
 * secret laws, punishable by civil and criminal penalties.
 *

******************************************************************/ include <stdlib.h>
include <stdio.h>
#include <sys/stat.h>
#include <stdarg.h>
#include <conio.h>
#include <string.h>
#include <dos.h>
#include <ctype.h>
#include <assert.h>
#include <fcntl.h>
#include <io.h>
#include <errno.h>
include <process.h> include "install.h"

/*****************************************************************/ define ASSERT( x)   assert( x)

/*****************************************************************/
/* Constants: */
```

```
const BYTE SYSID_BOOTPROD = 0xfe;/* SysID assigned to first partition
                               * when we really want a "production"
                               * boot.
                               */
const BYTE SYSID_INVALID = 0xf0;/* SysID that gets stamped in the
                               * automation partition in order to
                               * "hide" the automation partitoin
                               * when booting "production".
                               */
const BYTE SYSID_FAT12 = 0x01;/* SysID for DOS 12-bit FAT. */
/****************************************************************/
/* Global variables. */

/* Buffer where we read/modify the master boot sector. */

PartitionSector    mbrSector;
int                mbrSectorReadIn = 0;
int                mbrSectorNeedsSaving = 0;

DriveGeometry   geometryInfo;
int             geometryInfoReadIn = 0;

typedef struct {
        WORD startCylinder;
        WORD endCylinder;

WORD startHead;
        WORD endHead;

WORD startSector;
        WORD endSector;
} CylSpec;

CylSpec   auto_part;    /* CHS specs for the automation partition. */
/****************************************************************/
/* Program flags -- usually toggled with command-line arguments. */ int                verbose = 0;
int                querySteps = 0;

/****************************************************************/
/* Constant string data: */ define NUM_SAVE_FILE_NAMES   2
static const char *saveMBRNames[ NUM_SAVE_FILE_NAMES] = {
        "mbr.sv1",
        "mbr.sv2"
};
```

```
#if defined( WANT_FLOPPY_STAMP)
static const char   stage1_stamp_file[] = "stamp.st1";
endif if defined( OLD_MBR_FILE)
static const char autom_MBR_code_name[] = "autom.bin";
#else
static const char autom_MBR_code_name[] = "bootorg.bin";
#endif
/******************************************************************/
/* Forward references. */ int found_automation_partition_secret_stamp( void);

/******************************************************************/ void
inform( FILE *output_stream, char *format, ...)
{
        va_list   args;

va_start( args, format);

vfprintf( output_stream, format, args);
        fflush( output_stream);
}
/******************************************************************/ define INFORM_PROGRAMMER_ERROR(s) \
do {                               \
        inform( stderr, "Programmer error in file %s, line %d.\n",
__FILE__, __LINE__); \
        inform s ;                 \
} while (0)

/******************************************************************/
/* Using the given geometry, convert from
 *    (cyl  [0..numCyl-1],
 *          head [0..numHead-1],
 *          sector [1..numSector])
 *    to ABSOLUTE sector.
 */ if defined( UNUSED_CODE)

LONG
chs2abs( DriveGeometry *pGeom,
                       WORD cylinder,
```

```
                        WORD head,
                        WORD sector)
{
        LONG lCyl = (LONG)cylinder;
        LONG lHead = (LONG)head;
        LONG lSect = (LONG)sector - 1;/* Sectors number starting at
            one, not ZERO. */ return ( ( lCyl * (LONG)pGeom->heads * (LONG)pGeom-
            >sectors)
                                + ( lHead * (LONG)pGeom->sectors)
                                + ( lSect));
} endif   /* UNUSED_CODE */

/******************************************************************/
/* Using the given geometry, convert from absolute sector to
 *        (cyl [0..numCyl-1],
 *         head [0..numHead-1],
 *         sector [1..numSector]).
 */ if defined( UNUSED_CODE)

void
abs2chs( DriveGeometry *pGeom,
                        LONG abs,
                        WORD *pCylinder,
                        WORD *pHead,
                        WORD *pSector)
{
        LONG lCyl, lHead, lSect;
        LONG headsBySects = ( (LONG)pGeom->heads * (LONG)pGeom-
            >sectors);

/* Calculate whole number of cylinders. */
        lCyl = abs / headsBySects;

/* Get in abs the remaining number of sectors. */
        abs %= headsBySects;

/* Calculate whole number of heads (tracks). */
        lHead = abs / (LONG)pGeom->sectors;

/* Calculate the remaining number of sectors.
         * Note that we add one so that the sector number
         * is one-based rather than zero-based.
         */
        lSect = 1L + ( abs % (LONG)pGeom->sectors);
```

```c
            /* Check to make sure everything fits into a WORD. */
            ASSERT( (lCyl  & ~0xffffL) == 0);
            ASSERT( (lHead & ~0xffffL) == 0);
            ASSERT( (lSect & ~0xffffL) == 0);

*pCylinder      = (WORD)( lCyl  & 0xffffL);
            *pHead          = (WORD)( lHead & 0xffffL);
            *pSector        = (WORD)( lSect & 0xffffL);
}
#endif    /* UNUSED_CODE */

/*****************************************************************/ void
dump_partition_table( PartitionEntry *pTab)
{
            inform( stderr, "# : BOOT STH_ SCS_ SCYL SID_ ENDH ECS_ ECYL _1STSECT _NUMSECT\n");
            for ( int partition = 0 ; partition < 4 ; partition++) {
                inform( stderr,
                        "%ld : __%02x __%02x __%02x __%02x __%02x __%02x __%02x __%02x %8ld %8ld\n",
                        partition,
                        0xff & pTab[ partition].bootFlag,
                        0xff & pTab[ partition].startHead,
                        0xff & pTab[ partition].startCylSector,
                        0xff & pTab[ partition].startCyl,
                        0xff & pTab[ partition].systemID,
                        0xff & pTab[ partition].endHead,
                        0xff & pTab[ partition].endCylSector,
                        0xff & pTab[ partition].endCyl,
                        pTab[ partition].firstSector,
                        pTab[ partition].numSectors);
            } inform( stderr, "# : SCYL SSCT SHED  ECYL ESCT EHED\n");
            for ( partition = 0 ; partition < 4 ; partition++) {
                inform( stderr,
                        "%ld : %4d %4d %4d  %4d %4d %4d\n",
                        partition,
                        NUMBER_START_CYL( &pTab[ partition]),
                        NUMBER_START_SECT( &pTab[ partition]),
                        NUMBER_START_HEAD( &pTab[ partition]),
                        NUMBER_END_CYL( &pTab[ partition]),
                        NUMBER_END_SECT( &pTab[ partition]),
                        NUMBER_END_HEAD( &pTab[ partition]));
            }
}
```

```
/***********************************************/
/* Return ZERO if success, nonZERO if error.
 */ int
readDriveGeometry( DriveGeometry *pDG)
{
        union REGS          regs;

regs.h.ah = 0x08;   /* Function 8 == read drive parameters. */
        regs.h.dl = 0x80;   /* 0x80 == read FIRST hard disk. */ int86( 0x13,
               ®s,
               ®s);
        if ( regs.x.cflag)
            return -1;

pDG->cylinders = (  ( ( (WORD)regs.h.cl << 2) & 0x300)
                          | (WORD)regs.h.ch);
        pDG->heads = (WORD)regs.h.dh;
        pDG->sectors = (WORD)regs.h.cl & 0x003f; .

/* The geometry info returned from the BIOS
         * is the "maximum usable number" of things
         * (e.g. "maximum usable cylinder number",
         *       "maximum usable head number",
         *       "maximum usable sector number").
         * Since cylinders and heads count starting
         * at ZERO, we need to bump their numbers up
         * to the get "count" of usable cylinders and
         * heads. (Sectors count startings at one, so
         * we don't need to adjust the sector number.
         */
        pDG->cylinders++;
        pDG->heads++;

if ( verbose) {
            inform( stderr,
                    "Geometry: Cylinders = %d\n"
                  "          Heads     = %d\n"
                  "          Sectors   = %d\n",
                    pDG->cylinders,
                    pDG->heads,
                    pDG->sectors);
        } return 0; /* success */
}
```

```c
/****************************************************************/
/* Read drive geometry, then setup parameters in the auto_part
 * variable.
 */ void
setup_auto_part()
{
          if ( readDriveGeometry( &geometryInfo)) {
                inform( stderr, "Error reading Drive Geometry
                    information.\n");
                exit( 1);
          }
          geometryInfoReadIn = 1;

/* Compute how many cylinders it will take for five megabytes.
 * Use the following formula:
 *
 * cyls = 5242880 bytes * 1sect/512bytes * 1head/n_sectors *
 * 1cyl/m_heads
 *
 * where "n" is the number of sectors per head, and
 *       "m" is the number of heads per cylinder.
 */ define FIVE_MEG    ((LONG)( 5L * 1024L * 1024L))

LONG cylinders_required;

cylinders_required = FIVE_MEG;/* five megabytes. */
          cylinders_required /= 512L;/* bytes per sector */
          cylinders_required /= (LONG)(geometryInfo.sectors);
          /* sectors per head */
          cylinders_required /= (LONG)(geometryInfo.heads);
          /* heads per cyl. */ cylinders_required += 1;/* Round up. */ auto_part.startCylinder= geometryInfo.cylinders -
                (WORD)cylinders_required;
          auto_part.endCylinder= geometryInfo.cylinders - 1;

auto_part.startHead = 0;
          auto_part.endHead   = geometryInfo.heads - 1;

auto_part.startSector= 1;/* (sectors start counting at one.)
*/
          auto_part.endSector = geometryInfo.sectors;
}
```

```
/******************************************************************/
/* Get a character from the keyboard.  Keep getting characters until
 * the character received matches one of the characters in the
 * validChars string.  Return the matching character.
 *
 */ int
getKey( char *validChars)
{
        int key;

do {
            key = getch(); /* Get key with NO echo. */
            if ( key == 0x00) {
            /* Handle 2-character keypresses (e.g. HOME key).
             * Flush the input buffer--we don't handle multi-key
             * inputs here.
             */
                while (kbhit()) {
                    (void)getch();
                }
                key = -1; /* Make sure the strchr() at the end of the
                           * do/while loop doesn't match.
                           */
                continue; /* Wait for next keypress. */
            } if ( key == 0x3) {
                /* BREAK or control-C key pressed. */
        inform( stderr, "\nBREAK received: Program exiting.\n");
                exit( 1);
            }
        } while ( strchr( validChars, key) == NULL);

putch( key);    /* Echo the valid character. */ return key;
}

/******************************************************************/
/*
 * - DONE!
 *
 */ void
done()
{
        inform( stderr, "Program Done.\n");
```

```
        exit( 0);
}
/******************************************************************/
/* Read or write a sector of the hard disk into the buffer addressed
 * by seg:offset.
 *
 *      Return 0 if successful, nonZero on errors.
 *
 */ typedef unsigned char RW_Cmd;
define READ_CMD 0x02
define WRITE_CMD 0x03 int
read_or_write_sector( RW_Cmd operation,
                        unsigned short cylinder,
                        unsigned short head,
                        unsigned short sector,
                        unsigned short numSectors,
                        unsigned short segment,
                        unsigned short offset)
{
        union REGS          regs;
        struct SREGS    segregs;

ASSERT( ( cylinder & ~1023) == 0);
        ASSERT( ( head & ~0x00ff) == 0);
        ASSERT( ( sector & ~0x3f) == 0);
        ASSERT( numSectors < 256);

segregs.ds = 0;
        regs.h.dh = (BYTE)head;/* Head number */
        regs.h.dl = 0x80;    /* 0x80 specifies hard disk 0. */
        regs.h.ch = (BYTE)( cylinder & 0xff);/* Low 8 bits of
                cylinder number. */
        regs.h.cl = (BYTE)( ( cylinder & 0x300) >> 2);/* Upper 2
                bits of cylinder. */
        regs.h.cl |= (BYTE)( sector & 0x3f);/* add in the sector
                bits. */
        regs.h.ah = operation;/* Read or Write command. */
        regs.h.al = (BYTE)numSectors;/* Number of sectors to read or
                write. */ segregs.es = segment;/* ES:BX points to buffer. */
        regs.x.bx = offset;

int86x( 0x13,
                ®s,      /* Input registers. */
```

```c
                    ®s,     /* Output registers. */
                    &segregs);/* Segment registers. */ return ( regs.x.cflag
                 ? -1
                 : 0);
}

/************************************************/
/* Write a sector to the disk. */ int
write_sector( unsigned short cylinder,
                             unsigned short head,
                             unsigned short sector,
                             unsigned short numSectors,
                             unsigned short segment,
                             unsigned short offset)
{
        return read_or_write_sector( WRITE_CMD,
                             cylinder,
                             head,
                             sector,
                             numSectors,
                             segment,
                             offset);
}

/************************************************/
/* Read a sector from the disk. */ int
read_sector( unsigned short cylinder,
                             unsigned short head,
                             unsigned short sector,
                             unsigned short numSectors,
                             unsigned short segment,
                             unsigned short offset)
{
        return read_or_write_sector( READ_CMD,
                             cylinder,
                             head,
                             sector,
                             numSectors,
                             segment,
                             offset);
}

/********************************************************************/
/* Return 0 if successful, nonZero on errors.
```

```c
 *
 */ int
read_MBR_sector( PartitionSector *pBuf)
{
        return read_sector( 0,/* cyl */
                            0,/* head */
                            1,/* sector */
                            1,/* numSectors */
                            FP_SEG( pBuf),
                            FP_OFF( pBuf));
}

/****************************************************************/ int
write_MBR_sector( PartitionSector *pBuf)
{
        if ( querySteps) {
                int choice;
                dump_partition_table( pBuf->partitionTable);
                inform( stdout,
                         "I'm about to MODIFY the on-disk partition table. Continue?\n"
                         "(Y/N)-->");
                choice = toupper( getKey("YNyn"));
                inform( stdout, "\n");
                if ( choice == 'N') {
                        inform( stdout, "NOT writing partition sector.\n");
                        return 0;
                }
        } inform( stderr, "Writing new MBR sector...\n");

return write_sector( 0,/* cyl */
                             0,/* head */
                             1,/* sector */
                             1,/* numSectors */
                             FP_SEG( pBuf),
                             FP_OFF( pBuf));
}

/****************************************************************/
/* Read in a file and overlay the mbr sector.  Make sure the file
 * doesn't overwrite the partition table area of the mbr sector.
 *
 * Return ZERO if successful, else nonZero.
```

```
 *
 */ int
read_overlay_code_file( const char *code_filename,
                        int bytesToRead)
{
        int fd;
        struct stat statBuf;
        int num_read;
        int saved_fmode;

/* Make sure the mbr code has been read in. */
        ASSERT( mbrSectorReadIn);

/* Sanity check the min/max numbers. */
        ASSERT( bytesToRead > 0);
        ASSERT( bytesToRead <= 0x1be);

/* Force BINARY file I/O. */
        saved_fmode = _fmode;
        _fmode = O_BINARY;

/* Check that the file exists. */
        if ( stat( code_filename, &statBuf) != 0) {
            inform( stderr, "Unable to get information on (missing?)
                file '%s'.\n",
                        code_filename);
            goto error;
        }
        if ( statBuf.st_size < bytesToRead) {
            inform( stderr, "MBR code file '%s' too small (min %d
                bytes)\n",
                        code_filename,
                        bytesToRead);
            goto error;
        }

/* Overlay the MBR CODE by reading it from the code file. */ fd = open( code_filename, O_RDONLY);
        if ( fd < 0) {
            inform( stderr,
                    "Error opening MBR CODE file '%s'\n",
                    code_filename);
            goto error;
        } num_read = read( fd, mbrSector.raw_code_area, bytesToRead);
```

```
            if ( verbose) {
            inform( stderr, "Read %d bytes from file of %d byte
                length.\n",
                        num_read, (int)statBuf.st_size);
            } if ( num_read != bytesToRead) {
                inform( stderr,
                            "Error reading %d bytes from file '%s' "
                            "(only got %d bytes)\n",
                            bytesToRead,
                            code_filename,
                            num_read);
                goto error_need_close;
            } if ( close( fd)) {
                inform( stderr, "Error closing file '%s'\n",
                            code_filename);
                goto error;
            }

/* Mark boot record as needing to be saved. */
            mbrSectorNeedsSaving = 1;

_fmode = saved_fmode;/* Restore file I/O mode. */
            return 0; /* Success. */ error_need_close:
            (void)close( fd);

error:
            _fmode = saved_fmode;/* Restore file I/O mode. */
            inform( stderr, "Unable to overlay code section from
                file.\n");

return -1;      /* Failure. */
}
/*******************************************************************/
/* Save the original MBR code to the second sector of the
 * hard disk. Do NOT save the mbr code if it's
 * a keylabs automation code segment.
 *
 * The mbrSector parameter is a pointer to a PartitionSector
 * structure which contains the "current" MBR code from the disk.
 */
void
save_original_mbr_code_to_second_sector( PartitionSector *mbrSector)
```

```
{
            /* Check for a "keylabs" signature in the code area. */
            const BYTE MBR_signature[] = "KeyLabs BootMaster";

if ( ! memcmp( MBR_signature,
                            &mbrSector->raw_code_area[ 3],
                            sizeof( MBR_signature))) {
                    /* Found the keylabs signature... Do NOT save this
backup
                     * sector in the second sector.
                     */
                    inform( stderr, "MBR is KeyLabs code--NOT saving to
                            second sector.\n");
                    return;
            }
/* Else we need to save the MBR code (along with a signature)
 * in the SECOND sector of the hard disk.
 */
            static   BYTE secondSector[ 512];

memcpy( &secondSector[ 0], "SavedMBR", 9);
            memcpy( &secondSector[ 9], mbrSector->raw_code_area, 0x1be);
            memset( &secondSector[ 9 + 0x1be], 0, 512 - ( 9 + 0x1be));

if ( write_sector( 0,/* cyl */
                                0,/* head */
                                2,/* sector */
                                1,/* numSectors */
                                FP_SEG( secondSector),
                                FP_OFF( secondSector))) {
                    inform( stderr, "ERROR saving MBR code to second sector of
                            disk.\n");
                    exit( 1);
            }
            inform( stderr, "Saved original MBR code in second sector of
                    disk.\n");
}
/****************************************************************
/
/*
 * - Write new MBR CODE (only) to the first sector of the hard disk.
 *   Do NOT overwrite the partition table.
 *
 * Exit on failures (i.e. returns are assumed successful).
 *
 */
void
write_new_mbr_code_only()
```

```
{
            /* Check to see of the mbrSector needs saving. */
            if ( mbrSectorNeedsSaving) {
                INFORM_PROGRAMMER_ERROR(( stderr,
                                "Found mbrSector in need of save!"));
                exit( 1);
            }

/* First, read the ORIGINAL MBR sector. */
            if ( read_MBR_sector( &mbrSector)) {
                inform( stderr, "Error READING Master Boot Record.\n");
                goto error;
            }
            mbrSectorReadIn = 1;

/* Save the original MBR code in the second
             * sector of the hard disk.
             */
            save_original_mbr_code_to_second_sector( &mbrSector);

/* Now overlay the code from the "code" file. */
            if ( read_overlay_code_file( autom_MBR_code_name, 0x1be)) {
                inform( stderr, "Error overlaying MBR code file.\n");
                goto error;
            }

/* Now write the modified MBR sector. */
            if ( write_MBR_sector( &mbrSector)) {
                inform( stderr, "Error WRITING Master Boot Record.\n");
                goto error;
            } return;    /* SUCCESS. */ error:
            inform( stderr, "Unable to rewrite MBR code.\n");
            exit( 1);  /* DON'T return on errors. */
}
/****************************************************************/
/* Search for an existing automation partition which has the required
 * number of cylinders. If it's found, return its number [0..3]. If a
 * matching partition doesn't exist, return -1.
 *
 * On Entry:
 *          Assumes mbrSector contains valid data.
 *          Assumes GeometryInfo contains valid data.
 *
 */
```

```
int
get_existing_auto_partition()
{
        ASSERT( geometryInfoReadIn);
        ASSERT( mbrSectorReadIn);

int partition;

for ( partition = 0 ; partition < 4 ; partition++) {
        /* Check to see if the cylinder starts at the right place
         * AND ends at the right place.
         */
             if (   NUMBER_START_CYL( &TABLE_ENTRY( mbrSector,
                     partition)) == auto_part.startCylinder
                 && NUMBER_START_HEAD( &TABLE_ENTRY( mbrSector,
                     partition)) == 0
                 && NUMBER_START_SECT( &TABLE_ENTRY( mbrSector,
                     partition)) == 1
                 && NUMBER_END_CYL( &TABLE_ENTRY( mbrSector,
                     partition)) == ( geometryInfo.cylinders - 1)
                 && NUMBER_END_HEAD( &TABLE_ENTRY( mbrSector,
                     partition)) == ( geometryInfo.heads - 1)
                 && NUMBER_END_SECT( &TABLE_ENTRY( mbrSector,
                     partition)) == geometryInfo.sectors) {

/* We've found a partition with exactly the right geometry.  Now see
         * if it has the right signature.
         */
                   if ( found_automation_partition_secret_stamp()) {
                       if ( verbose) {
                           inform( stderr, "<< Found probable
automation partition at table index %d >>\n", partition);
                       }
                       return partition;
                   }
             }
        }
        return -1;    /* No matching partition found. */
}
/**************************************************************/
/*
 * - Check install requirements:
 *      1. At least one EMPTY slot in partition table.
 *      2. One of following TWO conditions:
 *           1. At least 5MB freespace (not in any partition)
 *              at END of disk.
 *           2. LAST partition on disk is the automation partition.
 *              (must verify by examining CONTENT of partition,
 *              not partition table entry, because there are no
```

```
 *              guarantees that the partition table will be ours).
 *              If this partition is found, we give the user TWO
 *              choices:
 *                 1. Rewrite the MBR code only and we're DONE!
 *                 2. Remove the existing automation partition
 *                    and continue this program to reinstall it
 *                    from scratch (e.g. to restore a corrupt
 *                    automation partition or to change lan
 *                    drivers in the partition).
 *
 */
void
check_requirements()
{
        int partition;
        int choice;

/* Read the master boot record. */
        if ( read_MBR_sector( &mbrSector)) {
            inform( stderr, "Error reading Master Boot Record.\n");
            exit( 1);
        }
        mbrSectorReadIn = 1;

/* Find a free slot. */
        for ( partition = 0 ; partition < 4 ; partition++) {
            if ( SYSID( mbrSector, partition) == 0x00) {
                /* Found it. */
                break;
            }
        }
        if ( partition >= 4) {
            /* Empty slot not found! */
            inform( stderr,
                "Partition table completely full.  This program\n"
                "requires at least one free parition-table
                    entry.\n");

/* CPC: Add code to allow user to specify a partion that we can
 * delete for him/her.  Then delete the partition (mark it free),
 * and use that as the "free" partition-table slot.
 */ exit( 1);
        }

/* First condition met: first slot in partition table is empty.
 * Now check for freespace at the END of the disk.
 */
```

90

```c
            setup_auto_part();
/* Configure information about the required geometry
 * of the automation partition.
 */
/* Check to see if the existing LAST partition on the disk exactly
 * matches the partition we need to create, AND has the automation-
 * partition signature.  If an existing automation partition is found,
 * we can either reuse it or recreate it.
 */
            int existing_automation_partition;
            existing_automation_partition =
                get_existing_auto_partition();

if ( existing_automation_partition != -1) {

/* We found an existing automation partition in the LAST partition
 * on the disk.  The user can elect to reuse it or overwrite it.
 */
                inform( stderr,
"I've found what appears to be an existing automation partition\n"
            "already on the disk.\n"
            "Do you want to reuse it (and rewrite only the MBR\n"
            "code), or do you want to delete the partition and
            recreate\n"
            "it from scratch?\n"
            "\n"
            "  Hit 'L' to leave the partition in place and rewrite
            only\n"
            "  the MBR code, or\n"
            "\n"
            "  Hit 'E' to erase and recreate the automation partition\n"
            "  from scratch.\n"
            "\n"
            "(L/E)-->");
                choice = toupper( getKey("LEle"));
                inform( stderr, "\n");
                switch( choice) {
                case 'L':
                    write_new_mbr_code_only();
                    done();
                    /* NOTREACHED */ case 'E':
/* Erase the existing automation partition. */
                    memset( &TABLE_ENTRY( mbrSector,
                        existing_automation_partition),
                            0,
                            sizeof( TABLE_ENTRY( mbrSector, 0)));
                    break;
```

```
                default:
                        INFORM_PROGRAMMER_ERROR(( stderr,
                                        "got key '%c' (%d) "
                                        "instead of expected 'le'\n",
                                        choice, choice ));
                        exit( 1);
                }
        }
/* We verify that we have enough space at the end by making sure that
 * no existing partition on the disk has an END cylinder greater than
 * or equal to our required START cylinder.
 */
        for ( partition = 0 ; partition < 4 ; partition++) {
                if ( NUMBER_END_CYL( &TABLE_ENTRY( mbrSector,
                        partition))
                        >= auto_part.startCylinder) {

/* An existing partition collides with our required freespace. */
                        inform( stderr,
"Partition %d overlaps the region required for the\n"
"automation partition.  It ends at cylinder %d, and I need\n"
"to start the automation partition on cylinder %d.\n"
"\n"
"You'll need to remove (or shrink) partition %d before\n"
"I can continue.\n"
"\n"
"Do you want me to REMOVE (DESTROY!) partition %d for you?\n"
"\n"
"(Y/N)-->",
                                partition,
                                NUMBER_END_CYL( &TABLE_ENTRY( mbrSector, partition)),
                                        auto_part.startCylinder,
                                        partition,
                                        partition);
                        choice = toupper( getKey("YNyn"));
                        inform( stderr, "\n");
                        switch( choice) {
                        case 'Y':
                                memset( &TABLE_ENTRY( mbrSector, 0),
                                        0,
                                        sizeof( TABLE_ENTRY( mbrSector, 0)));
                                break;

case 'N':
                                inform( stderr,
                                "Exiting.  "
                                "You'll need to adjust the partition
                                        yourself.\n");
                                exit( 1);
```

92

```
                        /* NOTREACHED */
                default:
                        INFORM_PROGRAMMER_ERROR((stderr,
                                "got key '%c' (%d) "
                                "instead of expected 'yn'\n",
                                choice, choice ));
                        exit( 1);
                }
            }
        }
}
/*********************************************************************/
/* Write the PartitionSector to the file.
 * exit() on errors.
 *
 */ if defined( WANT_FLOPPY_MBR_BACKUP_COPY)

void
write_mbr_file( const char *filename,
                        PartitionSector *pSector)
{
        int fd;

/* Force BINARY file I/O. */
        int saved_fmode = _fmode;
        _fmode = O_BINARY;

fd = creat( filename, S_IREAD | S_IWRITE);
        if ( fd < 0) {
            inform( stderr,
                        "ERROR creating MBR backup file %s. Aborting.\n",
                        filename);
            exit( 1);
        } if ( write( fd, pSector, sizeof( *pSector))
                != sizeof( *pSector)) {
            inform( stderr,
            "ERROR writing to MBR backup file %s. Aborting.\n",
                        filename);
            exit( 1);
        }
        if ( close( fd)) {
            inform( stderr,
            "ERROR closing MBR backup file %s. Aborting.\n",
```

```c
                    filename);
            exit( 1);
        }

_fmode = saved_fmode;/* Restore file mode. */
} endif   /* WANT_FLOPPY_MBR_BACKUP_COPY */

/************************************************/
/*
 * - Save hard disk's original MBR sector on the floppy (twice for
 *   safety!).
 *
 * - Also save the MBR CODE (only the code) in the second sector
 *        of the hard disk, but ONLY if the MBR code isn't a
 *        KeyLabs MBR code segment.
 *
 */ void
save_original_MBR_sector()
{
        static   PartitionSector saveMBRsector;

/* Read the master boot record. */
        if ( read_MBR_sector( &saveMBRsector)) {
              inform( stderr, "Error reading Master Boot Record.\n");
              exit( 1);
        } if defined( WANT_FLOPPY_MBR_BACKUP_COPY)
        /* Now save it on disk (more than once!) */
        for ( int i = 0 ; i < NUM_SAVE_FILE_NAMES ; i++) {
              write_mbr_file( saveMBRNames[ i], &saveMBRsector);
        }
endif /************************************************/
        /* Now save the MBR code in the second sector of
         * the disk (only if the MBR code isn't a KeyLabs
         * MBR code segment).
         *
         * We already have the MBR code in the saveMBRsector,
         * so we don't need to read it in again.
         */ save_original_mbr_code_to_second_sector( &saveMBRsector);
}
```

```c
/******************************************************************/
/*
 * - Collapse/defrag partition table so that first slot is FREE.
 *
 */
void
prep_partition_table()
{
        int partition;

/* Find a free slot.
 * We know there's at least one free slot because we checked for it
 * earlier.
 */
        for ( partition = 0 ; partition < 4 ; partition++) {
            if ( SYSID( mbrSector, partition) == 0x00) {
                /* Found it. */
                break;
            }
        }
        if ( partition >= 4) {
            /* Empty slot not found! */
            INFORM_PROGRAMMER_ERROR((stderr,
                            "Expected free slot not found "
                            "in prep_partition_table().\n"));
            exit( 1);
        } if ( partition != 0) {
/* We need to MOVE the first slot to this free slot. */
            memcpy( &TABLE_ENTRY( mbrSector, partition),
/* destination */
                            &TABLE_ENTRY( mbrSector, 0),/* source */
                            sizeof( TABLE_ENTRY( mbrSector, 0)));

/* clear out slot zero. */
            memset( &TABLE_ENTRY( mbrSector, 0),
                            0,
                            sizeof( TABLE_ENTRY( mbrSector, 0)));

/* Set flag indicating that we need to save the mbrSector because
 * we've modified it.
 */
            mbrSectorNeedsSaving = 1;
        }
}
/******************************************************************/
```

```c
/*
 * - SAVE original partition-active and system id bytes in the MBR
 *   somewhere. We need this so we can restore the partition sysid
 *   and ACTIVE flags after we format the automation partition
 *
 */
void
save_partition_info()
{
        int partition;

/* We save the partition information in the 64 bytes immediately
 * preceding the existing partition table.
 */
        BYTE *save_area = ( (BYTE *)&TABLE_ENTRY( mbrSector, 0)
                        - 4 * sizeof( TABLE_ENTRY( mbrSector,
0))));

for ( partition = 0 ; partition < 4 ; partition++) {
            memcpy( save_area,/* destination */
                    &TABLE_ENTRY( mbrSector, partition),/* source
*/
                    sizeof( TABLE_ENTRY( mbrSector, 0)));
            save_area += sizeof( TABLE_ENTRY( mbrSector, 0));
        }

/* Set flag indicating that we need to save the mbrSector because
 * we've modified it.
 */
        mbrSectorNeedsSaving = 1;
}

/****************************************************************/
/*
 * - Create 5 megabyte partition-table entry in partition-table:
 *      1. Occupies FIRST slot in partition table.
 *      2. Occupies LAST cylinders on disk.
 *      3. Mark it active. Mark all others INACTIVE, INVALID.
 *
 */
void
create_automation_partition()
{
        if ( SYSID( mbrSector, 0) != 0x00) {
            INFORM_PROGRAMMER_ERROR((stderr,
                        "Expected empty slot 0 not found!\n"));
            exit( 1);
```

```
            } setup_auto_part();

BOOT_FLAG( mbrSector, 0) = 0x80;/* Mark it ACTIVE. */
            START_HEAD( mbrSector, 0) = auto_part.startHead;
            START_CYLSECT( mbrSector, 0) = (BYTE)( (
auto_part.startCylinder >> 2)
                            & 0xC0);
            START_CYLSECT( mbrSector, 0) |= auto_part.startSector;/*
'or' in the starting sector number */
            START_CYL( mbrSector, 0) = (BYTE)( auto_part.startCylinder &
0xff);

SYSID( mbrSector, 0) = SYSID_FAT12;/* DOS, 12-bit FAT. */

END_HEAD( mbrSector, 0) = (BYTE)( auto_part.endHead & 0xff);
            END_CYLSECT( mbrSector, 0) = (BYTE)( (
auto_part.endCylinder >> 2)
                            & 0xC0);
            END_CYLSECT( mbrSector, 0) |= (BYTE)( auto_part.endSector &
0x3F);
            END_CYL( mbrSector, 0) = (BYTE)( auto_part.endCylinder &
0xff);

FIRST_SECTOR( mbrSector, 0) = (
(LONG)auto_part.startCylinder
                            * (LONG)geometryInfo.sectors
                            * (LONG)geometryInfo.heads);
            NUM_SECTORS( mbrSector, 0) = ( (
(LONG)geometryInfo.cylinders
                            - (LONG)auto_part.startCylinder)
                            * (LONG)geometryInfo.sectors
                            * (LONG)geometryInfo.heads);

/* Mark all but first partition inactive and invalid. */
            for ( int partition = 1 ; partition < 4 ; partition++) {
                BOOT_FLAG( mbrSector, partition) = 0x00;
                SYSID( mbrSector, partition) = 0;
            } mbrSectorNeedsSaving = 1;
}
/***************************************************************/
/*
 * - Flush modified MBR to disk.
 *
 */
```

```
void
flush_modified_mbr()
{
        if ( ! mbrSectorReadIn) {
                inform( stderr, "NOT writing MBR sector--it hasn't been
                        read in!\n");
                return;
        }
        if ( ! mbrSectorNeedsSaving) {
                inform( stderr, "NOT writing MBR sector--it hasn't been
                        modified!\n");
                return;
        }

/* Write the master boot record. */
        if ( write_MBR_sector( &mbrSector)) {
                inform( stderr, "Error writing Master Boot Record.\n");
                exit( 1);
        } mbrSectorNeedsSaving = 0;
}
/*****************************************************************/
/*
 * - Write "stage 1 done" stamp on floppy, AND in the first sector of
 *        the new automation partition.
 *
 */ static const BYTE stage1_partition_stamp[] = "KeyLabs Stage1 Stamp";
static BYTE autopart_buffer[ 512];

void
write_stage1_stamp()
{
#if defined( WANT_FLOPPY_STAMP)
        /* First, write the stamp on the floppy.
         */ int fd;

fd = creat( stage1_stamp_file, S_IREAD | S_IWRITE);
        if ( fd < 0) {
                inform( stderr,
                    "ERROR creating stage1 stamp file %s. Aborting.\n",
                        stage1_stamp_file);
                exit( 1);
        }
```

```
                if ( close( fd)) {
                        inform( stderr,
                            "ERROR closing stage1 stamp file %s. Aborting.\n",
                                stage1_stamp_file);
                        exit( 1);
                }
endif /* Now write the stamp in the first sector of the automation
 * partition.
 */
                if ( read_sector( auto_part.startCylinder,
                                        auto_part.startHead,
                                        auto_part.startSector,
                                        1,/* number of sectors. */
                                        FP_SEG( autopart_buffer),
                                        FP_OFF( autopart_buffer))) {
                        inform( stderr, "ERROR reading stamp from first sector
                                of automation partition.\n");
#if defined( WANT_FLOPPY_STAMP)
                        (void)unlink( stage1_stamp_file);
#endif
                        exit( 1);
                } memcpy( autopart_buffer,
                                        stage1_partition_stamp,
                                        sizeof( stage1_partition_stamp));

if ( write_sector( auto_part.startCylinder,
                                        auto_part.startHead,
                                        auto_part.startSector,
                                        1,/* number of sectors. */
                                        FP_SEG( autopart_buffer),
                                        FP_OFF( autopart_buffer))) {
                        inform( stderr, "ERROR writing stamp to first sector of
                                automation partition.\n");
#if defined( WANT_FLOPPY_STAMP)
                        (void)unlink( stage1_stamp_file);
#endif
                        exit( 1);
                }
}
/****************************************************************/
/* - Check for presence of stage 1 stamp in the first sector of the
 * automation partition.  (First check to see if a partition with the
 * expected geometry even exists...)
 *
 * Return nonZero if the stamp is found, ZERO if the stamp is NOT
```

```
 * found.
 *
 */ int
stage1_stamp_exists()
{
        static PartitionSectorlocal_mbrSector;

setup_auto_part();   /* Get geometry info and fill in
                auto_part structure. */

/* Check to see if the first partition table has the expected
 * geometry. */
        ASSERT( geometryInfoReadIn);
        /* Read the master boot record. */
        if ( read_MBR_sector( &local_mbrSector)) {
                inform( stderr, "Error reading Master Boot Record.\n");
                exit( 1);
        }

/* Check to see if the partition described in the first partition
 * table
 * slot starts at the right place AND ends at the right place.
 * (The "right place" is where we expect the automation partition to
 * be.)
 */
        if ( ! (   NUMBER_START_CYL( &TABLE_ENTRY( local_mbrSector,
                0)) == auto_part.startCylinder
                        && NUMBER_START_HEAD( &TABLE_ENTRY(
local_mbrSector, 0)) == 0
                        && NUMBER_START_SECT( &TABLE_ENTRY(
 local_mbrSector, 0)) == 1
                        && NUMBER_END_CYL( &TABLE_ENTRY( local_mbrSector,
0)) == ( geometryInfo.cylinders - 1)
                        && NUMBER_END_HEAD( &TABLE_ENTRY( local_mbrSector,
0)) == ( geometryInfo.heads - 1)
                        && NUMBER_END_SECT( &TABLE_ENTRY( local_mbrSector,
0)) == geometryInfo.sectors))
                {
                        /* No automation partition exists! */
                        return 0;  /* Can't be a stamp if there's no partition.
*/
                }

/* We know the partition exists where we expect it to be, so
         * now check for the "stage 1 stamp" in the partition.
         */
        if ( read_sector( auto_part.startCylinder,
                                auto_part.startHead,
```

100

```c
                                auto_part.startSector,
                                1,/* number of sectors. */
                                FP_SEG( autopart_buffer),
                                FP_OFF( autopart_buffer))) {
                inform( stderr, "ERROR reading stamp from first sector
                        of automation partition.\n");
                exit( 1);
        }
        return ( memcmp( autopart_buffer,
                                stage1_partition_stamp,
                                sizeof( stage1_partition_stamp)) == 0);
}

/*******************************************************************/
/*
 * - Erase "stage 1 done" stamp from the first sector of the
 *          new automation partition.
 *
 */
void
erase_stage1_stamp()
{
#if defined( WANT_FLOPPY_STAMP)
        erase_stage1_stamp_from_floppy();
endif /* Check to see if the stamp exists--don't try to erase it if it's not
 * already there (there might be valid data there instead!)
 */
        if ( ! stage1_stamp_exists()) {
            return;      /* Nothing to erase. */
        }

/* Ok, the stamp exists.  Erase it.
 */
        if ( read_sector( auto_part.startCylinder,
                                auto_part.startHead,
                                auto_part.startSector,
                                1,/* number of sectors. */
                                FP_SEG( autopart_buffer),
                                FP_OFF( autopart_buffer))) {
                inform( stderr, "ERROR reading stamp from first sector
                        of automation partition.\n");
                exit( 1);
        } memset( autopart_buffer,
                                0,
                                sizeof( stage1_partition_stamp));
```

101

```
            if ( write_sector( auto_part.startCylinder,
                               auto_part.startHead,
                               auto_part.startSector,
                               1,/* number of sectors. */
                               FP_SEG( autopart_buffer),
                               FP_OFF( autopart_buffer))) {
                    inform( stderr, "ERROR writing stamp to first sector of
                           automation partition.\n");
                    exit( 1);
            }
}
/*****************************************************************/
/*
 * - Erase the stage 1 stamp from the floppy.
 *
 */ if defined( WANT_FLOPPY_STAMP)
void
erase_stage1_stamp_from_floppy()
{
            if (   unlink( stage1_stamp_file)
                && errno != ENOENT) {
                    inform( stderr, "Unable to erase stage1 stamp file
'%s'\n",
                            stage1_stamp_file);
                    exit( 1);
            }
}
#endif    /* WANT_FLOPPY_STAMP */

/*****************************************************************/
/* Write a "secret" ID stamp in the partition boot record of the
 * automation partition so we can detect it on subsequent invocations
 * of this "install" program.
 *
 * We write our special signature to the OEM ID field in the BIOS
 * parameter block (offset 3 into the first sector of the partition).
 *
 */ static const BYTE automation_partition_secret_stamp[] = "KLautoKL";
static BYTE secret_buffer[ 512];

void
write_secret_id_stamp_to_auto_partition()
{
            /* Validate that the geometryInfo and
             * auto_part variables have valid values.
```

102

```
*/
ASSERT( geometryInfoReadIn);

/* Write a signature in the partition boot record so we
 * can detect it during subseqent "installs".
 */ if ( querySteps) {
    inform( stdout,
        "I'm about to stamp the OEM ID field in the BPB\n"
        "at chs(%u, %u, %u). OK?\n"
        "(Y/N)-->",
                    auto_part.startCylinder,
                    auto_part.startHead,
                    auto_part.startSector);
    int choice = toupper( getKey("YNyn"));
    inform( stdout,"\n");
    if ( choice == 'N') {
        inform( stdout, "Cancelled.\n");
        return;
    }
} if ( read_sector( auto_part.startCylinder,
                    auto_part.startHead,
                    auto_part.startSector,
                    1,/* number of sectors. */
                    FP_SEG( secret_buffer),
                    FP_OFF( secret_buffer))) {
    inform( stderr, "ERROR reading stamp bytes from
        automation partition.\n");
    exit( 1);
} memcpy( &secret_buffer[ 3],/* Overwrite the OEM ID field. */
                    automation_partition_secret_stamp,8);

if ( write_sector( auto_part.startCylinder,
                    auto_part.startHead,
                    auto_part.startSector,
                    1,/* number of sectors. */
                    FP_SEG( secret_buffer),
                    FP_OFF( secret_buffer))) {
    inform( stderr, "ERROR writing stamp bytes to
        automation partition.\n");
    exit( 1);
} return;
}
```

```c
/******************************************************************/
/* Check for the "secret" ID stamp in the partition boot record of the
 * (supposed) automation partition.  This check is an attempt to
 * verify that a suspected automation partition REALLY IS an
 * automation partition.
 * Return ZERO if the stamp is NOT found, return nonZero if the stamp
 * is found.
 * On Entry:
 *          Assumes GeometryInfo and auto_part contain valid data.
 */
int
found_automation_partition_secret_stamp()
{
        /* Validate that the geometryInfo and
         * auto_part variables have valid values.
         */
        ASSERT( geometryInfoReadIn);

if ( verbose) {
            inform( stderr,
              "Checking for partition stamp at chs( %u, %u,
                %u)...\n",
                            auto_part.startCylinder,
                            auto_part.startHead,
                            auto_part.startSector);
        }

/* Read the sector and check for the ID stamp. */
        if ( read_sector( auto_part.startCylinder,
                            auto_part.startHead,
                            auto_part.startSector,
                            1,/* number of sectors. */
                            FP_SEG( secret_buffer),
                            FP_OFF( secret_buffer))) {
            inform( stderr, "ERROR reading stamp bytes from
                automation partition.\n");
            return 0; /* Secret stamp not found. */
        }

/* Return TRUE if found, ZERO if not found. */
        return ( ! memcmp( &secret_buffer[ 3],
/* Check the OEM ID field. */
                            automation_partition_secret_stamp,
                            8));
}
/******************************************************************/
/*
 * - Reboot machine.
```

```
 *
 *      This function never returns.
 *
 */
void
reboot()
{
        if ( querySteps) {
            int choice;
            inform( stdout,
                "I'm about to REBOOT the machine. Continue?\n"
                "(Y/N)-->");
            choice = toupper( getKey("YNyn"));
            inform( stdout, "\n");
            if ( choice == 'N') {
            inform( stdout, "NOT rebooting... EXITING( 1)
                instead.\n");

/* ERASE the stage1 stamp--we don't want to try to run stage 2
 * the next time we run--we want to run stage1 again.
 */
                erase_stage1_stamp();
                exit( 1);
            }
        } inform( stderr, "Rebooting...\n");

if defined( SOFT_REBOOT_PREFERRED)
        _asm int 19h;
#else
        _asm db    0eah,00,00,0ffh,0ffh;/* jmp0ffffh:0h */
#endif
}
/***************************************************************/
/*
 * - NOVELL DOS 7 format the partition: "FORMAT C: /S /U /V:AUTOMATE
/X".
 *
 */ void
format_c_drive()
{
        inform( stderr, "Formatting automation partition...\n");
        if ( spawnlp( P_WAIT,
                        "command",
                        "command",
```

```
                                    "/C",
                                    "FORMAT",
                                    "C:",
                                    "/S",
                                    "/U",
                                    "/V:KEYLABSAUTO",
                                    "/X",
                                    "<FORMATAU.CMD",
                                    NULL)) {
                    inform( stderr, "Unable to FORMAT automation partition
                            on drive C:\n");
                    exit( 1);
            }
            inform( stderr, "Format of automation partition
                    complete.\n");
}
/*************************************************************/
/*
 * - Copy necessary DOS/LAN driver/Autoexec files from floppy to
 *   automation partition.
 *
 */
void
copy_files_to_c_drive()
{
            inform( stderr, "\nRunning COPYDOS batch file to copy DOS
                    files...\n\n");

/* Run batch file to copy DOS files. */
            if ( spawnlp( P_WAIT,
                                    "command",
                                    "command",
                                    "/C",
                                    "COPYDOS.BAT",
                                    NULL)) {
                    inform( stderr, "Unable to run batch file
                            COPYDOS.BAT\n");
                    exit( 1);
            } inform( stderr, "\nRunning COPYNET batch file to copy
                    NETWORK files...\n\n");

if ( spawnlp( P_WAIT,
                                    "command",
                                    "command",
                                    "/C",
                                    "COPYNET.BAT",
```

```c
                        NULL)) {
            inform( stderr, "Unable to run batch file
                COPYNET.BAT\n");
            exit( 1);
        } inform( stderr, "File copies complete.\n");
}
/******************************************************************/
/*
 * - Mark FIRST partition slot NOT ACTIVE and NOT VALID
 *   (so the original partition is back to being the "real" and active
 * one).
 */ void
mark_first_slot_inactive_and_invalid()
{
        /* Write the master boot record. */
        if ( read_MBR_sector( &mbrSector)) {
            inform( stderr, "Error reading Master Boot Record.\n");
            exit( 1);
        }
        mbrSectorReadIn = 1;
        BOOT_FLAG( mbrSector, 0) = 0x00;/* Mark it INactive. */
        SYSID( mbrSector, 0) = SYSID_INVALID;/* Mark in INvalid. */ mbrSectorNeedsSaving = 1;/* Mark it CHANGED. */
}

/******************************************************************/
/*
 * - RESTORE original ACTIVE and SYSID
 *   bytes from the place we saved them earlier (in the MBR).
 *
 */ void
restore_original_partition_info()
{
        int partition;

/* We restore the partition information from the 64 bytes immediately
 * preceding the existing partition table (where we saved it earlier.
 * Note that we only need to restore entries 1..3, since entry 0 is
 * our automation partition which has already been marked INACTIVE
 * and INVALID.
 */
```

```
        BYTE *save_area = ( (BYTE *)&TABLE_ENTRY( mbrSector, 0) - 4
            * sizeof( TABLE_ENTRY( mbrSector, 0)));

PartitionEntry *pTab = (PartitionEntry *)save_area;

for ( partition = 1 ; partition < 4 ; partition++) {

BOOT_FLAG( mbrSector, partition) = pTab[
                partition].bootFlag;
            SYSID( mbrSector, partition) = pTab[
                partition].systemID;
        } mbrSectorNeedsSaving = 1;
}
/****************************************************************/
/* Restore saved MBR code from the "save" disk file.
 *
 * This function does NOT return (it calls exit() instead).
 *
 */ void
restore_MBR_code_from_disk_file()
{
        int i;

for ( i = 0 ; i < NUM_SAVE_FILE_NAMES ; i++) {
            /* First, read the ORIGINAL MBR sector. */
            if ( read_MBR_sector( &mbrSector)) {
                inform( stderr, "Error READING original Master
                    Boot Record.\n");
                break;
            }
            mbrSectorReadIn = 1;

if ( read_overlay_code_file( saveMBRNames[ i], 0x1be))
{
                inform( stderr, "Error reading overlay code file
                    '%s'.\n", saveMBRNames[ i]);
                .continue;
            }
            /* Successfully overlayed the code file.
             * Now write it back to disk.
             */
            /* Now write the modified MBR sector. */
            if ( write_MBR_sector( &mbrSector)) {
                inform( stderr, "Error WRITING Master Boot
                    Record.\n");
```

```
                    break;
            } exit( 0 ); /* SUCCESS! */
        } exit( 1 );
}
/*******************************************************************/
/*
 * STAGE 1 Pseudocode:
 *
 * - Check install requirements:
 *       1. At least one EMPTY slot in partition table.
 *       2. One of following TWO conditions:
 *             1. At least 5MB freespace (not in any partition)
 *                at END of disk.
 *             2. LAST partition on disk is the automation partition.
 *                (must verify by examining CONTENT of partition,
 *                not partition table entry, because there are no
 *                guarantees that the partition table will be ours).
 *                If this partition is found, we give the user TWO
 *                choices:
 *                    1. Rewrite the MBR code only and we're DONE!
 *                    2. Remove the existing automation partition
 *                       and continue this program to reinstall it
 *                       from scratch (e.g. to restore a corrupt
 *                       automation partition or to change lan
 *                       drivers in the partition).
 *
 * - Save hard disk's original MBR sector on the floppy (twice for
 *   safety!).
 *
 * - Collapse/defrag partition table so that first slot is FREE.
 *
 * - SAVE original partition-active and system id bytes in the MBR
 *   somewhere.  We need this so we can restore the partition sysid
 *   and ACTIVE flags after we format the automation partition
 *
 * - Create 5 megabyte partition-table entry in partition-table:
 *       1. Occupies FIRST slot in partition table.
 *       2. Occupies LAST cylinders on disk.
 *       3. Mark it active. Mark all others INACTIVE, INVALID.
 *       4. Write signature to partition-boot record somewhere so we
 *          can find/reuse this partition on a subsequent "install".
 *
 * - Flush modified MBR to disk.
 *
 * - Write "stage 1 done" stamp in the first sector of the newly
```

```
 * created automation partition.  This stamp tells us to run stage2
 * when we're next invoked (after the reboot).
 *
 * - Reboot machine.
 *
 */ void
stage1()
{
            check_requirements();

save_original_MBR_sector();

prep_partition_table();

save_partition_info();

create_automation_partition();

flush_modified_mbr();

write_stage1_stamp();

reboot();
}
/****************************************************************/
/*
 * STAGE 2 Pseudocode:
 *
 * - Verify that the stage 1 stamp exists in the automation partition.
 *
 * - DOS format the partition: "FORMAT C: /S". (this zaps the stage 1
 *       stamp in the partition).
 *
 * - Copy necessary DOS/LAN driver/Autoexec files from floppy to
 *   automation partition.
 *
 * - Mark FIRST partition slot NOT ACTIVE (so the original partition
 *   is back to being the active one).
 *
 * - RESTORE original ACTIVE and SYSID
 *   bytes from the place we saved them earlier (in the MBR).
 *
 * - Save the new parition table.
 *
 * - Write new MBR CODE (only) to the first sector of the hard disk.
 *   Do NOT overwrite the partition table.
 *
```

110

```
 * - Write "secret" ID stamp to automation partition. (This is done so
 *   that this install program can detect the automation partition
 *   if this install program is ever reinvoked.)
 *
 * - DONE!
 *
 */ void
stage2()
{
#if defined( WANT_FLOPPY_STAMP)
        erase_stage1_stamp_from_floppy();
endif if ( ! stage1_stamp_exists()) {
            inform( stderr,
            "Stage 1 stamp not found in automation partition.\n"
            "I'm assuming this is because stage 1 didn't run\n"
            "to completion, so I'm not going to run stage 2.\n"
            "Run this program again to re-execute stage 1.\n\n");
            exit( 1);
        } format_c_drive();

copy_files_to_c_drive();

mark_first_slot_inactive_and_invalid();

restore_original_partition_info();

if ( read_overlay_code_file( autom_MBR_code_name, 0x1be)) {
            inform( stderr, "Error overlaying MBR code file.\n");
            exit( 1);
        } flush_modified_mbr();

write_secret_id_stamp_to_auto_partition();

done();
}

/******************************************************************/
void
usage()
{
```

```
            inform( stderr,
                    "Usage: %s [-r] [+-][qv]\n"
                    "   where:\n"
                    "      +q = Enable query mode (default).\n"
                    "      -q = Disable query mode.\n"
                    "      +v = Enable verbose mode (default).\n"
                    "      -v = Disable verbose mode.\n"
                    "      -r = RESTORE MBR code.\n"
                    "\n");
}

/*****************************************************************/
/*
 * MAIN Pseudocode:
 *
 * - Check for stage1 stamp on disk.  If it exists, run stage2
 *   code.  Otherwise, run stage1 code.
 *
 */ int
main( int argc, char *argv[])
{
            /* Parse command-line arguments. */
            int arg;
            for ( arg = 1 ; arg < argc ; arg++) {
                if ( stricmp( argv[ arg], "-r") == 0) {
                    restore_MBR_code_from_disk_file();
                    /* NOTREACHED */
                }
                if ( stricmp( argv[ arg], "+v") == 0) {
                    verbose = 1;
                }
                else if ( stricmp( argv[ arg], "-v") == 0) {
                    verbose = 0;
                }
                else if ( stricmp( argv[ arg], "+q") == 0) {
                    querySteps = 1;
                }
                else if ( stricmp( argv[ arg], "-q") == 0) {
                    querySteps = 0;
                }
                else {
                    inform( stderr, "Illegal command-line argument "
                            "'%s'.\n", argv[ arg]);
                    usage();
                    exit( 1);
                }
            }
```

```c
/* Run either stage 1 or stage 2 install portion
 * depending on whether or not the "stage 1 stamp"
 * exists in the automation partition.
 */ if ( ! stage1_stamp_exists()) {
    /* File doesn't exist, so run stage 1. */
    stage1();
}
else {
    /* File exists, so run stage 2. */
    stage2();
} return 0;
}
```

We claim:

1. A method for gaining control of a computer prior to the normal boot sequence operating on a digital computer system, said digital computer system including:
   means for storing data;
   means for processing data;
   means for connecting said digital computer system to an external source of commands;
   means for displaying data; and
   means for inputting data,
   the method comprising:
   testing automatically for automation boot sequence data, said test including reading a boot selection flag and comparing said boot selection flag with a known flag setting;
   transferring control of said computer system to automation code, if said testing automatically step indicates an automation boot sequence;
   executing a control process for said means for connecting said digital computer system to an external source of commands, if said testing automatically step indicates an automation boot sequence;
   performing said external commands, if said testing automatically step indicates an automation boot sequence;
   setting said boot selection flag; and
   booting normally, if said testing automatically step indicates a normal boot sequence.

2. A method for gaining control of a computer prior to the normal boot sequence operating on a digital computer system, as recited in claim 1, further comprising
   creating an automation partition on said means for storing data.

3. A method for gaining control of a computer prior to the normal boot sequence operating on a digital computer system, as recited in claim 1, further comprising
   resetting said digital computer system to a known state.

4. A method for gaining control of a computer prior to the normal boot sequence operating on a digital computer system, as recited in claim 1, wherein said executing a control process further comprises:
   loading an operating system;
   loading a set of interface drivers;
   executing said operating system;
   executing said interface drivers; and
   accessing a set of externally stored commands.

5. A method for gaining control of a computer prior to the normal boot sequence operating on a digital computer system, as recited in claim 1, wherein said performing said external commands further comprises:
   searching for valid commands;
   executing said valid commands; and
   setting said boot selection flag.

6. A method for gaining control of a computer prior to the normal boot sequence operating on a digital computer system, as recited in claim 1, further comprising
   booting said digital computer system normally if said testing automatically step indicates that said computer system's boot selection flag is set to boot normally.

7. A method for gaining control of a computer prior to the normal boot sequence operating on a digital computer system, as recited in claim 1, wherein said external source of commands originates on a second computer system connected to said digital computer system via a network interface.

8. A digital computer system programmed to perform the method of gaining control of the boot procedure of a digital computer, said digital computer comprising:
   (A) a central processing unit;
   (B) a memory unit;
   (C) a long term storage device; and
   (D) a means of booting said digital computer, said means of booting including a first set of commands, said first set of commands resident on said storage device of said digital computer for booting said digital computer, and a second set of commands, said second set of commands resident on a storage device external to said digital computer, for booting said digital computer,
   the method comprising:
   testing automatically for source of said means of booting; said test including reading a boot selection flag and comparing said boot selection flag with a known flag setting;
   transferring control of said computer system to said source of said means of booting;
   performing said external commands, if said testing automatically step indicates a boot sequence stored externally to said digital computer;
   setting said boot selection flag; and
   booting normally, if said testing automatically step indicates a boot sequence stored internal to said digital computer.

9. A digital computer system as recited in claim 8, further comprising:
   a network interface;
   a network interface driver; and
   a server computer.

10. A digital computer system as recited in claim 9, wherein said transferring control includes transferring control of said digital computer system to said server computer.

11. A digital computer system as recited in claim 9, wherein said external commands are stored on said server computer.

12. A digital computer system as recited in claim 9, further comprising initializing said digital computer system to a known initial state.

* * * * *